United States Patent
Yang et al.

(10) Patent No.: US 11,063,807 B2
(45) Date of Patent: Jul. 13, 2021

(54) METHOD FOR UPLINK MULTIUSER DATA TRANSMISSION AND SYSTEM FOR UPLINK MULTIUSER MULTIPLE INPUT MULTIPLE OUTPUT

(71) Applicant: Huawei Technologies Co., Ltd., Shenzhen (CN)

(72) Inventors: Xun Yang, Shenzhen (CN); Yi Luo, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/378,160

(22) Filed: Apr. 8, 2019

(65) Prior Publication Data
US 2019/0238386 A1    Aug. 1, 2019

Related U.S. Application Data

(63) Continuation of application No. 14/757,735, filed on Dec. 23, 2015, which is a continuation of application No. PCT/CN2014/073229, filed on Mar. 11, 2014.

(30) Foreign Application Priority Data

Jun. 25, 2013   (CN) .......................... 201310255933.0

(51) Int. Cl.
*H04B 7/0452*    (2017.01)
*H04L 27/26*    (2006.01)
(Continued)

(52) U.S. Cl.
CPC ....... *H04L 27/2695* (2013.01); *H04B 7/0452* (2013.01); *H04B 7/066* (2013.01);
(Continued)

(58) Field of Classification Search
None
See application file for complete search history.

(56) References Cited

U.S. PATENT DOCUMENTS 8,437,440 B1    5/2013  Zhang et al.
8,902,769 B1 *  12/2014 Dehghan ................. H04L 43/08
                                                            370/252
(Continued)

FOREIGN PATENT DOCUMENTS

CN    1568026 A    1/2005
CN    101136881 A   3/2008
(Continued)

OTHER PUBLICATIONS

"Wireless QoS Part 3—User Priorities, Access Categories, and Queues," (/revolutionwifi/2010/08/wireless-qos-part-3-user-priorities.html), pp. 1-7. Revolution Wifi, Minneapolis, Minnesota (Aug. 3, 2010).

(Continued)

*Primary Examiner* — Nicholas Sloms
(74) *Attorney, Agent, or Firm* — Leydig, Voit & Mayer, Ltd.

(57) ABSTRACT

A method for uplink multiuser data transmission and a system for uplink multiuser multiple input multiple output are provided. The method implemented by an access point (AP) includes: sending, indication information to at least two stations (STAs), wherein the indication information indicates that the at least two STAs perform an uplink multiuser data transmission; receiving, uplink data sent by the at least two STAs through channels, respectively; and demodulating, the uplink data using receiving beams corresponding to pre-estimated channels, respectively. According to the embodiments of the present disclosure, the AP receives the uplink data from multiple STAs through different channels from the STAs to the AP respectively, and (Continued)

demodulates data using the receiving beams corresponding to the channels respectively, thereby realizing that the AP performs separation and demodulation of the uplink data sent by multiple STAs and realizing the uplink multiuser data transmission.

12 Claims, 13 Drawing Sheets

(51) Int. Cl.
    *H04B 7/08* (2006.01)
    *H04L 25/02* (2006.01)
    *H04B 7/06* (2006.01)
(52) U.S. Cl.
    CPC ....... *H04B 7/0848* (2013.01); *H04L 25/0204* (2013.01); *H04L 25/0218* (2013.01); *H04L 27/2602* (2013.01); *H04L 27/2649* (2013.01); *H04L 25/0224* (2013.01)

(56) References Cited

U.S. PATENT DOCUMENTS

| | | | |
|---|---|---|---|
| 2005/0094791 A1 | 5/2005 | Clark et al. | |
| 2006/0062189 A1 | 3/2006 | Takeuchi | |
| 2007/0098060 A1 | 5/2007 | Tanaka | |
| 2008/0056133 A1 | 3/2008 | Deshpande et al. | |
| 2009/0046793 A1 | 2/2009 | Love et al. | |
| 2010/0008318 A1 | 1/2010 | Wentink et al. | |
| 2010/0086013 A1 | 4/2010 | Pare, Jr. et al. | |
| 2010/0111220 A1 | 5/2010 | Rouquette-Leveil et al. | |
| 2010/0189167 A1 | 7/2010 | Pare, Jr. et al. | |
| 2010/0220679 A1 | 9/2010 | Abraham et al. | |
| 2010/0290360 A1 | 11/2010 | Ge et al. | |
| 2010/0290449 A1 | 11/2010 | Van Nee et al. | |
| 2011/0032839 A1 | 2/2011 | Chen et al. | |
| 2011/0077017 A1 | 3/2011 | Yu et al. | |
| 2011/0122805 A1* | 5/2011 | Abraham | H04W 72/0486 370/312 |
| 2011/0164597 A1 | 7/2011 | Amini et al. | |
| 2011/0194644 A1 | 8/2011 | Liu et al. | |
| 2011/0199946 A1 | 8/2011 | Breit et al. | |
| 2011/0268054 A1 | 11/2011 | Abraham et al. | |
| 2011/0268094 A1* | 11/2011 | Gong | H04L 1/1685 370/338 |
| 2011/0299480 A1 | 12/2011 | Breit et al. | |
| 2012/0008490 A1 | 1/2012 | Zhu | |
| 2012/0008572 A1 | 1/2012 | Gong et al. | |
| 2012/0026928 A1* | 2/2012 | Gong | H04W 4/08 370/312 |
| 2012/0051342 A1 | 3/2012 | Liu et al. | |
| 2012/0063406 A1 | 3/2012 | Seok | |
| 2012/0127899 A1 | 5/2012 | Ketchum et al. | |
| 2012/0128090 A1 | 5/2012 | Seok | |
| 2012/0140615 A1 | 6/2012 | Gong | |
| 2012/0182886 A1 | 7/2012 | Ong et al. | |
| 2012/0314694 A1 | 12/2012 | Hsieh | |
| 2012/0315938 A1 | 12/2012 | Van Nee et al. | |
| 2012/0327915 A1 | 12/2012 | Kang et al. | |
| 2013/0114506 A1* | 5/2013 | Cai | H04W 4/06 370/328 |
| 2013/0229996 A1* | 9/2013 | Wang | H04W 72/0413 370/329 |
| 2013/0230120 A1 | 9/2013 | Yang et al. | |
| 2013/0235836 A1 | 9/2013 | Roh et al. | |
| 2013/0272211 A1 | 10/2013 | Quan et al. | |
| 2013/0286959 A1 | 10/2013 | Lou et al. | |
| 2013/0301463 A1 | 11/2013 | Lee et al. | |
| 2013/0301551 A1 | 11/2013 | Ghosh et al. | |
| 2013/0336306 A1 | 12/2013 | Sohn et al. | |
| 2014/0003399 A1* | 1/2014 | Liu | H04W 4/08 370/336 |
| 2014/0044089 A1 | 2/2014 | Lopez et al. | |
| 2014/0105200 A1 | 4/2014 | Seok | |
| 2014/0119288 A1 | 5/2014 | Zhu et al. | |
| 2014/0192716 A1* | 7/2014 | Pantelidou | H04L 1/1848 370/328 |
| 2014/0192742 A1 | 7/2014 | Gong et al. | |
| 2014/0219263 A1 | 8/2014 | Seok | |
| 2014/0307650 A1 | 10/2014 | Vermani et al. | |
| 2014/0307653 A1 | 10/2014 | Liu et al. | |
| 2014/0334420 A1 | 11/2014 | You et al. | |
| 2015/0036572 A1 | 2/2015 | Seok | |
| 2015/0085777 A1 | 3/2015 | Seok | |
| 2015/0110046 A1 | 4/2015 | Merlin et al. | |
| 2015/0289147 A1 | 10/2015 | Lou et al. | |
| 2016/0043783 A1 | 2/2016 | Xia et al. | |

FOREIGN PATENT DOCUMENTS

| | | |
|---|---|---|
| CN | 101192865 A | 6/2008 |
| CN | 101383645 A | 3/2009 |
| CN | 101399631 A | 4/2009 |
| CN | 101414942 A | 4/2009 |
| CN | 101479958 A | 7/2009 |
| CN | 101779405 A | 7/2010 |
| CN | 101835098 A | 9/2010 |
| CN | 101873633 A | 10/2010 |
| CN | 101969327 A | 2/2011 |
| CN | 102013959 A | 4/2011 |
| CN | 102090126 A | 6/2011 |
| CN | 102098252 A | 6/2011 |
| CN | 102104404 A | 6/2011 |
| CN | 102111201 A | 6/2011 |
| CN | 102201891 A | 9/2011 |
| CN | 102237920 A | 11/2011 |
| CN | 102334374 A | 1/2012 |
| CN | 102404852 A | 4/2012 |
| CN | 102726103 A | 5/2012 |
| CN | 102461278 A | 10/2012 |
| CN | 102711135 A | 10/2012 |
| CN | 102804637 A | 11/2012 |
| CN | 102932948 A | 2/2013 |
| CN | 103081552 A | 5/2013 |
| EP | 2538599 A1 | 12/2012 |

OTHER PUBLICATIONS

U.S. Appl. No. 14/757,735, filed Dec. 23, 2015.
U.S. Appl. No. 16/380,804, filed Apr. 10, 2019.
U.S. Appl. No. 16/380,819, filed Apr. 10, 2019.
"IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 8: Medium Access Control (MAC) Quality of Service Enhancements," IEEE Computer Society, pp. 1-211, Institute of Electrical and Electronics Engineers, New York, New York (Nov. 2005).

* cited by examiner

METHOD FOR UPLINK MULTIUSER DATA TRANSMISSION AND SYSTEM FOR UPLINK MULTIUSER MULTIPLE INPUT MULTIPLE OUTPUT

CROSS REFERENCE TO RELATED APPLICATIONS

This application is a continuation of U.S. patent application Ser. No. 14/757,735, filed on Dec. 23, 2015, which is a continuation of International Patent Application No. PCT/CN2014/073229, filed on Mar. 11, 2014, which claims priority to Chinese Patent Application No. 201310255933.0, filed with the Chinese Patent Office on Jun. 25, 2013, all of which are hereby incorporated by reference in their entireties.

FIELD OF THE INVENTION

Embodiments of the present disclosure relate to the technical field of communications, and in particular, to methods for uplink multiuser data transmission and systems for uplink multiuser multiple input multiple output (UL MU MIMO).

BACKGROUND OF THE INVENTION

MIMO in a wireless communication system refers to that multidimensional space resources are built by means of multiple antennas, these multidimensional space resources form multiple parallel paths, and a wireless station may use these multiple parallel paths to transmit multiplex signals, so as to improve a transmission rate of data. Further, since a wireless station for sending and a wireless station for receiving are different in the number of antennas, a scenario that a station with a larger number of antennas may support transmitting data simultaneously with multiple stations with a smaller number of antennas appears. Generally, transmitting data from a station with a larger number of antennas to mutiple stations with a smaller number of antennas is called downlink multiuser MIMO (DL MU-MIMO), and transmitting data simultaneously from the mutiple stations with a smaller number of antennas to the station with a larger number of antennas is called uplink multiuser MIMO (UL MU-MIMO).

A transceiver structure of the uplink multiuser MIMO is shown in FIG. 1, wherein each station (STA) only has one antenna; K STAs send their respective data to an access point (AP) simultaneously. The AP may demodulate K paths of mutually independent data information simultaneously by means of space resources obtained due to the number of its antennas which is greater than or equals to K, and channels H provide K dimensions for this communication.

However, when UL MU-MIMO is applied to a wireless system, a problem of how an AP separates and demodulates data of each STA to realize an uplink multiuser data transmission still needs to be solved.

SUMMARY OF THE INVENTION

Embodiments of the present disclosure provide methods for uplink multiuser data transmission and systems for uplink multiuser multiple input multiple output, which can realize an uplink multiuser data transmission.

In order to solve the above technical problem, the embodiments of the present disclosure disclose the following technical solutions:

In a first aspect, a method for uplink multiuser data transmission is provided, including:

sending, by an access point (AP), indication information to at least two stations STAs, wherein the indication information is used for indicating that the at least two STAs perform an uplink multiuser data transmission;

receiving, by the AP, uplink data sent by the at least two STAs through channels from the at least two STAs to the AP, respectively;

demodulating, by the AP, the uplink data sent by the at least two STAs using receiving beams corresponding to pre-estimated channels from the at least two STAs to the AP, respectively.

In combination with the above-mentioned first aspect, in a first possible implementation manner, after the sending, by an AP, indication information to at least two STAs, the method further includes:

estimating, by the AP, the channels from the at least two STAs to the AP according to information for performing channel estimation sent by the at least two STAs, respectively.

In combination with the above-mentioned first aspect, and/or the first possible implementation manner, in a second possible implementation manner, the estimating, by the AP, the channels from the at least two STAs to the AP according to information for performing channel estimation sent by the at least two STAs respectively includes:

receiving, by the AP, first data frame preambles sent by the at least two STAs simultaneously through the channels from the at least two STAs to the AP, respectively, the first data frame preamble including a training sequence for channel estimation, wherein training sequences of the at least two STAs are mutually orthogonal;

estimating, by the AP, the channels from the at least two STAs to the AP according to the training sequences in the first data frame preambles, respectively.

In combination with the above-mentioned first aspect, and/or the first possible implementation manner, and/or the second possible implementation manner, in a third possible implementation manner, the estimating, by the AP, the channels from the at least two STAs to the AP according to information for performing channel estimation sent by the at least two STAs respectively includes:

receiving, by the AP, second data frame preambles sent by the at least two STAs in turn through the channels from the at least two STAs to the AP, respectively, wherein the second data frame preamble includes identification information of the STA;

estimating, by the AP, the channels from the at least two STAs to the AP according to the identification information of the STAs in the second data frame preambles, respectively.

In combination with the above-mentioned first aspect, and/or the first possible implementation manner, and/or the second possible implementation manner, and/or the third possible implementation manner, in a fourth possible implementation manner, before the sending, by an AP, indication information to at least two STAs, the method further includes:

estimating, by the AP, the channels from the at least two STAs to the AP according to information for performing channel estimation sent by the at least two STAs, respectively.

In combination with the above-mentioned first aspect, and/or the first possible implementation manner, and/or the second possible implementation manner, and/or the third possible implementation manner, and/or the fourth possible implementation manner, in a fifth possible implementation manner, the estimating, by the AP, the channels from the at least two STAs to the AP according to information for performing channel estimation sent by the at least two STAs respectively includes:

sending, by the AP, a first request to the at least two STAs one by one, wherein the first request is used for indicating that the at least two STAs feed back null data packets NDPs after receiving the request, respectively;

estimating, by the AP, the channels from the at least two STAs to the AP according to the NDPs fed back one by one by the at least two STAs through the channels from the at least two STAs to the AP, respectively.

In combination with the above-mentioned first aspect, and/or the first possible implementation manner, and/or the second possible implementation manner, and/or the third possible implementation manner, and/or the fourth possible implementation manner, and/or the fifth possible implementation manner, in a sixth possible implementation manner, the estimating, by the AP, the channels from the at least two STAs to the AP according to information for performing channel estimation sent by the at least two STAs respectively includes:

sending, by the AP, a second request, wherein the second request is used for indicating that the at least two STAs feed back NDPs simultaneously after receiving the second request, respectively;

receiving, by the AP, the NDPs fed back simultaneously by the at least two STAs through channels from the at least two STAs to the AP, respectively, the NDP including a training sequence for channel estimation, wherein training sequences of the at least two STAs are mutually orthogonal;

calculating, by the AP according to the training sequences in the NDPs and estimating the channels from the at least two STAs to the AP according to calculation results, respectively.

In combination with the above-mentioned first aspect, and/or the first possible implementation manner, and/or the second possible implementation manner, and/or the third possible implementation manner, and/or the fourth possible implementation manner, and/or the fifth possible implementation manner, and/or the sixth possible implementation manner, in a seventh possible implementation manner, the method further includes:

replying, by the AP, acknowledge information to the at least two STAs after demodulating the uplink data sent by the at least two STAs.

In combination with the above-mentioned first aspect, and/or the first possible implementation manner, and/or the second possible implementation manner, and/or the third possible implementation manner, and/or the fourth possible implementation manner, and/or the fifth possible implementation manner, and/or the sixth possible implementation manner, and/or the seventh possible implementation manner, in an eighth possible implementation manner, before the sending, by an AP, indication information to at least two STAs, the method further includes:

determining, by the AP, STAs need to perform an uplink data transmission from multiple STAs as the at least two STAs.

In combination with the above-mentioned first aspect, and/or the first possible implementation manner, and/or the second possible implementation manner, and/or the third possible implementation manner, and/or the fourth possible implementation manner, and/or the fifth possible implementation manner, and/or the sixth possible implementation manner, and/or the seventh possible implementation manner, and/or the eighth possible implementation manner, in a ninth possible implementation manner, the determining, by the AP, STAs need to perform an uplink data transmission from multiple STAs as the at least two STAs includes:

broadcasting, by the AP, request indication information to the multiple STAs, wherein the request indication information is used for indicating that the STAs which need to perform an uplink data transmission within the multiple STAs send requests for uploading data to the AP;

receiving, by the AP, the requests for uploading data sent by the STAs which need to perform an uplink data transmission, wherein the request for uploading data includes an identification sequence for uniquely identifying the STAs which need to perform an uplink data transmission, and identification sequences of the STAs which need to perform an uplink data transmission are mutually orthogonal;

determining, by the AP, the STAs which need to perform an uplink data transmission according to the identification sequence.

In combination with the above-mentioned first aspect, and/or the first possible implementation manner, and/or the second possible implementation manner, and/or the third possible implementation manner, and/or the fourth possible implementation manner, and/or the fifth possible implementation manner, and/or the sixth possible implementation manner, and/or the seventh possible implementation manner, and/or the eighth possible implementation manner, and/or the ninth possible implementation manner, in a tenth possible implementation manner, the determining, by the AP, STAs need to perform an uplink data transmission from multiple STAs as the at least two STAs includes:

receiving, by the AP, their respective sending buffer information sent in turn by the multiple STAs;

selecting, by the AP, STAs of which the sending buffer information reaches a threshold condition from the multiple STAs as the STAs which need to perform an uplink data transmission.

In combination with the above-mentioned first aspect, and/or the first possible implementation manner, and/or the second possible implementation manner, and/or the third possible implementation manner, and/or the fourth possible implementation manner, and/or the fifth possible implementation manner, and/or the sixth possible implementation manner, and/or the seventh possible implementation manner, and/or the eighth possible implementation manner, and/or the ninth possible implementation manner, and/or the tenth possible implementation manner, in an eleventh possible implementation manner, before the sending, by an AP, indication information to at least two STAs, the method further includes:

receiving, by the AP, uplink data sent by a single STA;

determining, by the AP, whether an idle space-time stream exists according to number of space-time streams occupied by the uplink data sent by the single STA; if yes, executing, by the AP, a step of the sending indication information to at least two STAs.

In a second aspect, a method for uplink multiuser data transmission is providing, including:

receiving, by a station (STA), indication information sent by an access point (AP), wherein the indication information is used for indicating that at least two STAs which include the STA perform an uplink multiuser data transmission;

sending, by the STA, uplink data through a channel from the STA to the AP, so that the AP demodulates uplink data sent by the at least two STAs using receiving beams corresponding to pre-estimated channels from the at least two STAs to the AP, respectively.

In combination with the above-mentioned second aspect, in a first possible implementation manner, after the receiving, by an STA, indication information sent by an AP, the method further includes:

sending, by the STA, information for performing channel estimation to the AP, so that the AP estimates the channel from the STA to the AP according to the information for performing channel estimation.

In combination with the above-mentioned second aspect, and/or the first possible implementation manner, in a second possible implementation manner, the sending, by the STA, information for performing channel estimation to the AP includes:

sending, by the STA, a first data frame preamble through the channel from the STA to the AP, the first data frame preamble including a training sequence for channel estimation, wherein the at least two STAs send respective first data frame preambles simultaneously, and training sequences of the at least two STAs are mutually orthogonal.

In combination with the above-mentioned second aspect, and/or the first possible implementation manner, and/or the second possible implementation manner, in a third possible implementation manner, the sending, by the STA, information for performing channel estimation to the AP includes:

sending, by the STA, a second data frame preamble through the channel from the STA to the AP, wherein the at least two STAs send respective second data frame preambles in turn, and the second data frame preambles of the at least two STAs include identification information thereof.

In combination with the above-mentioned second aspect, and/or the first possible implementation manner, and/or the second possible implementation manner, and/or the third possible implementation manner, in a fourth possible implementation manner, before the receiving, by an STA, indication information sent by an AP, the method further includes:

sending, by the STA, information for performing channel estimation to the AP, so that the AP estimates the information from the STA to the AP according to the information for performing channel estimation.

In combination with the above-mentioned second aspect, and/or the first possible implementation manner, and/or the second possible implementation manner, and/or the third possible implementation manner, and/or the fourth possible implementation manner, in a fifth possible implementation manner, the sending, by the STA, information for performing channel estimation to the AP includes:

receiving, by the STA, a first request sent by the AP to the at least two STAs one by one, wherein the first request is used for indicating that the at least two STAs feed back null data packets NDPs after receiving the request, respectively;

feeding back, by the STA, an NDP through the channel from the STA to the AP.

In combination with the above-mentioned second aspect, and/or the first possible implementation manner, and/or the second possible implementation manner, and/or the third possible implementation manner, and/or the fourth possible implementation manner, and/or the fifth possible implementation manner, in a sixth possible implementation manner, the sending, by the STA, information for performing channel estimation to the AP includes:

receiving, by the STA, a second request sent by the AP, wherein the second request is used for indicating that the at least two STAs feed back NDPs simultaneously after receiving the request, respectively;

feeding back, by the STA, an NDP through the channel from the STA to the AP, the NDP including a training sequence for channel estimation, wherein training sequences of the at least two STAs are mutually orthogonal.

In combination with the above-mentioned second aspect, and/or the first possible implementation manner, and/or the second possible implementation manner, and/or the third possible implementation manner, and/or the fourth possible implementation manner, and/or the fifth possible implementation manner, and/or the sixth possible implementation manner, in a seventh possible implementation manner, the method further includes:

receiving, by the STA, acknowledge information replyed by the AP after the uplink data sent by the STA is demodulated.

In combination with the above-mentioned second aspect, and/or the first possible implementation manner, and/or the second possible implementation manner, and/or the third possible implementation manner, and/or the fourth possible implementation manner, and/or the fifth possible implementation manner, and/or the sixth possible implementation manner, and/or the seventh possible implementation manner, in an eighth possible implementation manner, before the receiving, by an STA, indication information sent by an AP, the method further includes:

receiving, by the STA, request indication information broadcasted by the AP, wherein the request indication information is used for indicating that STAs which need to perform an uplink data transmission in the multiple STAs send requests for uploading data to the AP;

sending, a request for uploading data to the AP when the STA needs to perform an uplink data transmission, wherein the request for uploading data includes an identification sequence for uniquely identifying the STA, and identification sequences of the STAs which need to perform an uplink data transmission are mutually orthogonal.

In combination with the above-mentioned second aspect, and/or the first possible implementation manner, and/or the second possible implementation manner, and/or the third possible implementation manner, and/or the fourth possible implementation manner, and/or the fifth possible implementation manner, and/or the sixth possible implementation manner, and/or the seventh possible implementation manner, and/or the eighth possible implementation manner, in a ninth possible implementation manner, before the receiving, by an STA, indication information sent by an AP, the method further includes:

sending, by the STA, sending buffer information thereof to the AP, so that the AP selects STAs of which sending buffer information reaches a threshold condition from the multiple STAs as STAs which need to perform an uplink data transmission.

In combination with the above-mentioned second aspect, and/or the first possible implementation manner, and/or the second possible implementation manner, and/or the third possible implementation manner, and/or the fourth possible implementation manner, and/or the fifth possible implementation manner, and/or the sixth possible implementation manner, and/or the seventh possible implementation manner, and/or the eighth possible implementation manner, and/or the ninth possible implementation manner, in a tenth possible implementation manner, after the receiving, by an STA, indication information sent by an AP, the method further includes:

changing, by the STA, a format for sending data to a transmission format which supports uplink multiuser multiple input multiple output, and then executing a step of sending, by the STA, uplink data through a channel from the STA to the AP.

In combination with the above-mentioned second aspect, and/or the first possible implementation manner, and/or the second possible implementation manner, and/or the third possible implementation manner, and/or the fourth possible implementation manner, and/or the fifth possible implementation manner, and/or the sixth possible implementation manner, and/or the seventh possible implementation manner, and/or the eighth possible implementation manner, and/or the ninth possible implementation manner, and/or the tenth possible implementation manner, in an eleventh possible implementation manner, before the receiving, by an STA, indication information sent by an AP, the method further includes:

monitoring, by the STA, uplink data sent by other STAs to the AP;

comparing, by the STA, number of space-time streams occupied by the uplink data sent by other STAs with number of space-time streams supported by the AP;

sending, by the STA, the uplink data to the AP when an idle space-time stream exists on the AP.

In a third aspect, an access device is provided, including:

a sending indication unit, configured to send indication information to at least two stations STAs, wherein the indication information is used for indicating that the at least two STAs perform an uplink multiuser data transmission;

a data receiving unit, configured to receive uplink data sent by the at least two STAs through channels from the at least two STAs to the AP, respectively;

a data demodulating unit, configured to demodulate the uplink data sent by the at least two STAs using receiving beams corresponding to pre-estimated channels from the at least two STAs to the AP, respectively.

In combination with the above-mentioned third aspect, in a first possible implementation manner, the access device further includes:

a first channel estimation unit, configured to estimate the channels from the at least two STAs to the AP according to information for performing channel estimation sent by the at least two STAs after the sending indication unit sends the indication information to the at least two STAs, respectively.

In combination with the above-mentioned third aspect, and/or the first possible implementation manner, in a second possible implementation manner, the first channel estimation unit includes:

a first receiving subunit, configured to receive first data frame preambles sent by the at least two STAs simultaneously through the channels from the at least two STAs to the AP, respectively, the first data frame preamble including a training sequence for channel estimation, wherein training sequences of the at least two STAs are mutually orthogonal;

a first determining subunit, configured to estimate the channels from the at least two STAs to the AP according to the training sequences in the first data frame preambles, respectively.

In combination with the above-mentioned third aspect, and/or the first possible implementation manner, and/or the second possible implementation manner, in a third possible implementation manner, the first channel estimation unit includes:

a second receiving subunit, configured to receive second data frame preambles sent by the at least two STAs in turn through the channels from the at least two STAs to the AP, respectively, wherein the second data frame preamble includes identification information of the STAs;

a second determining subunit, configured to estimate the channels from the at least two STAs to the AP according to the identification information of the STAs in the second data frame preambles, respectively.

In combination with the above-mentioned third aspect, and/or the first possible implementation manner, and/or the second possible implementation manner, and/or the third possible implementation manner, in a fourth possible implementation manner, the access device further includes:

a second channel estimation unit, configured to estimate the channels from the at least two STAs to the AP according to information for performing channel estimation sent by the at least two STAs respectively before the sending indication unit sends the indication information to the at least two STAs.

In combination with the above-mentioned third aspect, and/or the first possible implementation manner, and/or the second possible implementation manner, and/or the third possible implementation manner, and/or the fourth possible implementation manner, in a fifth possible implementation manner, the second channel estimation unit includes:

a first sending subunit, configured to send a first request to the at least two STAs one by one, wherein the first request is used for indicating that the at least two STAs feed back null data packets NDPs after receiving the request, respectively;

a third determining subunit, configured to estimate the channels from the at least two STAs to the AP according to the NDPs fed back by the at least two STAs one by one through the channels from the at least two STAs to the AP, respectively.

In combination with the above-mentioned third aspect, and/or the first possible implementation manner, and/or the second possible implementation manner, and/or the third possible implementation manner, and/or the fourth possible implementation manner, and/or the fifth possible implementation manner, in a sixth possible implementation manner, the second channel estimation unit includes:

a second sending subunit, configured to send a second request, wherein the second request is used for indicating that the at least two STAs feed back NDPs simultaneously after receiving the second request, respectively;

a feedback receiving subunit, configured to receive the NDPs fed back by the at least two STAs simultaneously through the channels from the at least two STAs to the AP, respectively, the NDP including a training sequence for channel estimation, wherein training sequences of the at least two STAs are mutually orthogonal;

a fourth determining subunit, configured to estimate the channels from the at least two STAs to the AP according to training sequences in the NDPs, respectively.

In combination with the above-mentioned third aspect, and/or the first possible implementation manner, and/or the second possible implementation manner, and/or the third possible implementation manner, and/or the fourth possible implementation manner, and/or the fifth possible implementation manner, and/or the sixth possible implementation manner, in a seventh possible implementation manner, the access device further includes:

a acknowledge replying unit, configured to reply acknowledge information to the at least two STAs after the uplink data sent by the at least two STAs is demodulated.

In combination with the above-mentioned third aspect, and/or the first possible implementation manner, and/or the second possible implementation manner, and/or the third possible implementation manner, and/or the fourth possible implementation manner, and/or the fifth possible implementation manner, and/or the sixth possible implementation manner, and/or the seventh possible implementation manner, in an eighth possible implementation manner, the access device further includes:

a station determining unit, configured to determine STAs which need to perform an uplink data transmission from multiple STAs as the at least two STAs before the sending indication unit sends the indication information to the at least two STAs.

In combination with the above-mentioned third aspect, and/or the first possible implementation manner, and/or the second possible implementation manner, and/or the third possible implementation manner, and/or the fourth possible implementation manner, and/or the fifth possible implementation manner, and/or the sixth possible implementation manner, and/or the seventh possible implementation manner, and/or the eighth possible implementation manner, in a ninth possible implementation manner, the station determining unit includes:

a broadcasting subunit, configured to broadcast request indication information to the multiple STAs, wherein the request indication information is used for indicating that STAs which need to perform an uplink data transmission from the multiple STAs send requests for uploading data to the AP;

a request receiving subunit, configured to receive the requests for uploading data sent by the STAs which need to perform an uplink data transmission, wherein the requests for uploading data include identification sequences for uniquely identifying the STAs which need to perform an uplink data transmission, and identification sequences of the STAs which need to perform an uplink data transmission are mutually orthogonal;

a first station determining subunit, configured to determine the STAs which need to perform an uplink data transmission according to the identification sequence.

In combination with the above-mentioned third aspect, and/or the first possible implementation manner, and/or the second possible implementation manner, and/or the third possible implementation manner, and/or the fourth possible implementation manner, and/or the fifth possible implementation manner, and/or the sixth possible implementation manner, and/or the seventh possible implementation manner, and/or the eighth possible implementation manner, and/or the ninth possible implementation manner, in a tenth possible implementation manner, the station determining unit includes:

an information receiving subunit, configured to their receive respective sending buffer information sent by the multiple STAs in turn;

a second station determining subunit, configured to select STAs of which the sending buffer information reaches a threshold condition from the multiple STAs as the STAs which need to perform an uplink data transmission.

In combination with the above-mentioned third aspect, and/or the first possible implementation manner, and/or the second possible implementation manner, and/or the third possible implementation manner, and/or the fourth possible implementation manner, and/or the fifth possible implementation manner, and/or the sixth possible implementation manner, and/or the seventh possible implementation manner, and/or the eighth possible implementation manner, and/or the ninth possible implementation manner, and/or the tenth possible implementation manner, in an eleventh possible implementation manner, the access device further includes:

a single data receiving unit, configured to receive uplink data sent by a single STA before the sending indication unit sends the indication information to the at least two STAs;

a determining unit, configured to determine whether an idle space-time stream exists according to number of space-time streams occupied by the uplink data sent by the single STA; if yes, the AP executes a step of the sending indication information to at least two STAs.

In a fourth aspect, a station is provided, including:

an indication receiving unit, configured to receive indication information sent by an access point AP, wherein the indication information is used for indicating that at least two STAs which includes the STA perform an uplink multiuser data transmission;

a data sending unit, configured to send uplink data through a channel from the data sending unit to the AP, so that the AP demodulates uplink data sent by the at least two STAs using receiving beams corresponding to pre-estimated channels from the at least two STAs to the AP, respectively.

In combination with the above-mentioned fourth aspect, in a first possible implementation manner, the station further includes:

a first information sending unit, configured to send information for performing channel estimation to the AP after the indication receiving unit receives the indication information sent by the AP, so that the AP estimates a channel from the STA to the AP according to the information for performing channel estimation.

In combination with the above-mentioned fourth aspect, and/or the first possible implementation manner, in a second possible implementation manner, the first information sending unit is specifically configured to send a first data frame preamble through a channel from the first information sending unit to the AP, the first data frame preamble including a training sequence for channel estimation, wherein the at least two STAs send respective first data frame preambles simultaneously, and training sequences of the at least two STAs are mutually orthogonal.

In combination with the above-mentioned fourth aspect, and/or the first possible implementation manner, and/or the second possible implementation manner, in a third possible implementation manner, the first information sending unit is specifically configured to send a second data frame preamble through the channel from the first information sending unit to the AP, wherein the at least two STAs send their respective second data frame preambles in turn, and the second data frame preambles of the at least two STAs include identification information thereof.

In combination with the above-mentioned fourth aspect, and/or the first possible implementation manner, and/or the second possible implementation manner, and/or the third possible implementation manner, in a fourth possible implementation manner, the station further includes:

a second information sending unit, configured to send information for performing channel estimation to the AP before the indication receiving unit receives the indication information sent by the AP, so that the AP estimates information from the STA to the AP according to the information for performing channel estimation.

In combination with the above-mentioned fourth aspect, and/or the first possible implementation manner, and/or the second possible implementation manner, and/or the third possible implementation manner, and/or the fourth possible implementation manner, in a fifth possible implementation manner, the second information sending unit includes:

a first request receiving subunit, configured to receive a first request sent by the AP to the at least two STAs one by one, wherein the first request is used for indicating that the at least two STAs feed back null data packets NDPs after receiving the request, respectively;

a first feedback subunit, configured to feed back an NDP through the channel from the first feedback subunit to the AP.

In combination with the above-mentioned fourth aspect, and/or the first possible implementation manner, and/or the second possible implementation manner, and/or the third possible implementation manner, and/or the fourth possible implementation manner, and/or the fifth possible implementation manner, in a sixth possible implementation manner, the second information sending unit includes:

a second request receiving subunit, configured to receive a second request sent by the AP, wherein the second request is used for indicating that the at least two STAs feed back NDPs simultaneously after receiving the request, respectively;

a second feedback subunit, configured to feed back an NDP through the channel from the second feedback subunit to the AP, the NDP including a training sequence for channel estimation, wherein training sequences of at least two STAs are mutually orthogonal.

In combination with the above-mentioned fourth aspect, and/or the first possible implementation manner, and/or the second possible implementation manner, and/or the third possible implementation manner, and/or the fourth possible implementation manner, and/or the fifth possible implementation manner, and/or the sixth possible implementation manner, in a seventh possible implementation manner, the station further includes:

an acknowledge receiving unit, configured to receive acknowledge information replied by the AP after the uplink data sent by the STA is demodulated.

In combination with the above-mentioned fourth aspect, and/or the first possible implementation manner, and/or the second possible implementation manner, and/or the third possible implementation manner, and/or the fourth possible implementation manner, and/or the fifth possible implementation manner, and/or the sixth possible implementation manner, and/or the seventh possible implementation manner, in an eighth possible implementation manner, the station further includes:

a broadcast receiving unit, configured to receive request indication information broadcasted by the AP before the indication receiving unit receives the indication information sent by the AP, wherein the request indication information is used for indicating that STAs which need to perform an uplink data transmission in the multiple STAs send requests for uploading data to the AP;

a request sending unit, configured to send a request for uploading data to the AP when an uplink data transmission needs to be performed, wherein the request for uploading data includes an identification sequence for uniquely identifying the STA, and identification sequences of the STAs which need to perform an uplink data transmission are mutually orthogonal.

In combination with the above-mentioned fourth aspect, and/or the first possible implementation manner, and/or the second possible implementation manner, and/or the third possible implementation manner, and/or the fourth possible implementation manner, and/or the fifth possible implementation manner, and/or the sixth possible implementation manner, and/or the seventh possible implementation manner, and/or the eighth possible implementation manner, in a ninth possible implementation manner, the station further includes:

a buffer sending unit, configured to send sending buffer information thereof to the AP before the indication receiving unit receives the indication information sent by the AP, so that the AP selects STAs of which sending buffer information reaches a threshold condition from the multiple STAs as STAs which need to perform an uplink data transmission.

In combination with the above-mentioned fourth aspect, and/or the first possible implementation manner, and/or the second possible implementation manner, and/or the third possible implementation manner, and/or the fourth possible implementation manner, and/or the fifth possible implementation manner, and/or the sixth possible implementation manner, and/or the seventh possible implementation manner, and/or the eighth possible implementation manner, and/or the ninth possible implementation manner, in a tenth possible implementation manner, the station further includes:

a format changing unit, configured to change a format for sending data to a transmission format which supports uplink multiuser multiple input multiple output after the indication receiving unit receives the indication information sent by the AP, and the data sending unit sends the uplink data through the channel from the data sending unit to the AP.

In combination with the above-mentioned fourth aspect, and/or the first possible implementation manner, and/or the second possible implementation manner, and/or the third possible implementation manner, and/or the fourth possible implementation manner, and/or the fifth possible implementation manner, and/or the sixth possible implementation manner, and/or the seventh possible implementation manner, and/or the eighth possible implementation manner, and/or the ninth possible implementation manner, and/or the tenth possible implementation manner, in an eleventh possible implementation manner, the station further includes:

a monitoring unit, configured to monitor uplink data sent by other STAs to the AP before the indication receiving unit receives the indication information sent by the AP;

a comparing unit, configured to compare number of space-time streams occupied by the uplink data sent by other STAs with number of space-time streams supported by the AP;

a carrying transmission unit, configured to send uplink data to the AP when an idle space-time stream exists on the AP.

In a fifth aspect, a system for multiuser data transmission is provided, including the access device as mentioned in the third aspect, and multiple stations as mentioned in the fourth aspect.

According to embodiments of the present disclosure, the AP receives the uplink data from multiple STAs through different channels from the STAs to the AP respectively, and demodulates data using the receiving beams corresponding to the channels respectively, thereby realizing that the AP perform separation and demodulation of the uplink data sent by multiple STAs and realizing the uplink multiuser data transmission.

BRIEF DESCRIPTION OF THE DRAWINGS

To illustrate the technical solutions in embodiments of the present disclosure or in the prior art more clear, a brief introduction on the drawings which are needed in the description of the embodiments or the prior art will be given below. Apparently, based on which other drawings may be obtained by those skilled in the art without any inventive efforts.

DETAILED DESCRIPTION OF THE EMBODIMENTS

In order to make those skilled in the art better understand technical solutions in embodiments of the present disclosure and that the purposes, technical solutions and advantages of the embodiments in the present disclosure are clearer, a further detailed description of the technical solutions in the embodiments of the present disclosure will be given below in combination with accompanying drawings.

Figure 1:
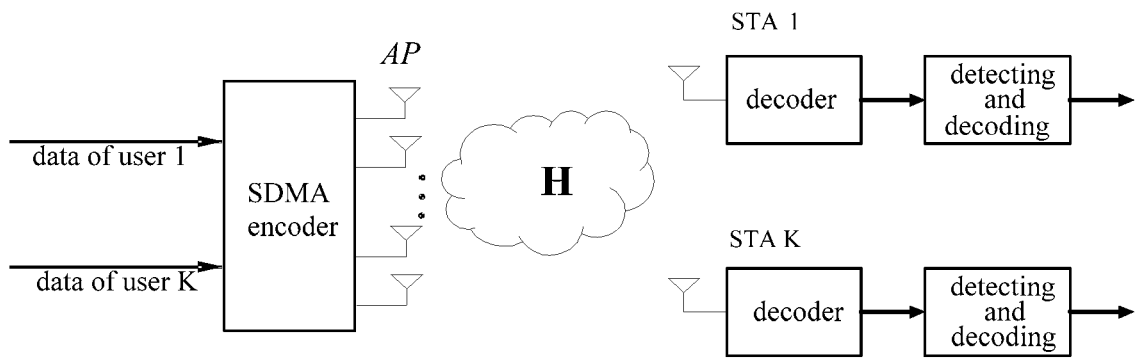
FIG. 1 is a schematic diagram of a transceiver structure of uplink multiuser MIMO in the prior art.
Figure 2:
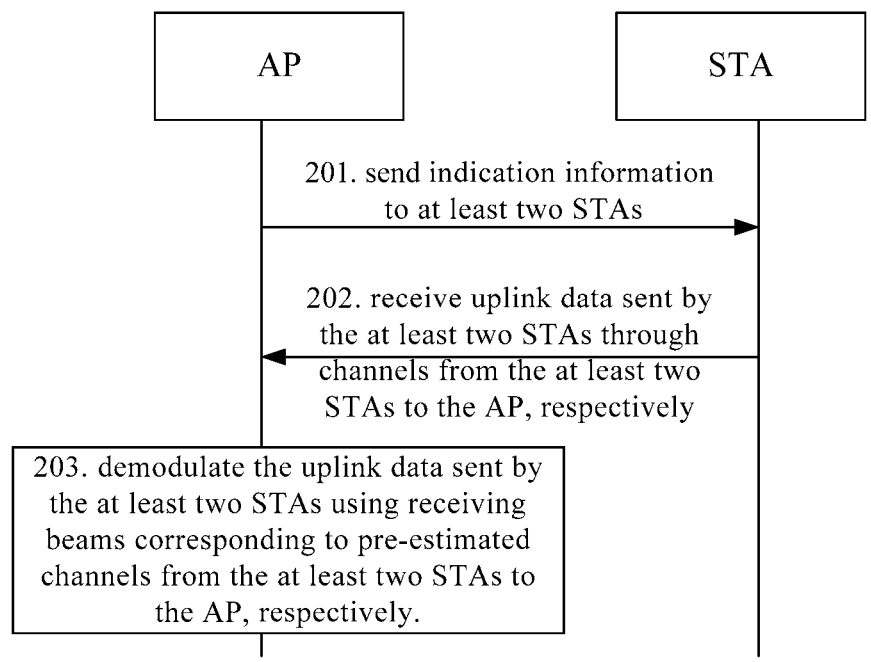
FIG. 2 is a flowchart of a method for uplink multiuser data transmission according to an embodiment of the present disclosure.

Referring to FIG. 2, it is a flowchart of a method for an uplink multiuser data transmission according to an embodiment of the present disclosure.

The method may include:

Step 201, an AP sends indication information to at least two STAs, wherein the indication information is used for indicating that the at least two STAs perform an uplink multiuser data transmission.

The AP may broadcast the indication information to all STAs or send the indication information to specified two or more than two STAs, wherein the indication information is used for indicating that the STAs which receive the indication information perform the uplink multiuser data transmission.

Specifically, the AP may send the indication information through a UL MU Poll (request) frame to indicate that the STAs which receive the frame initiate a data transmission after a fixed period of time. The UL MU Poll frame also may carry information such as an MCS (Modulation and Coding Scheme) recommended by the AP for each STA, number of space-time streams and the like, or information such as a maximum of MCS, a maximum of number of space-time streams and the like. The recommended MCS and number of space-time streams are used to inform the STAs of an MCS value and number of space-time streams that the AP considers more appropriate, which aims to make the STAs select appropriate values for the two parameters as quick as possible, so as to ensure an error rate while maximizing a transmission rate.

Step 202, the AP receives uplink data sent by the at least two STAs through their respective channels to the AP.

After receiving the indication information, a STA may initiate a UL MU-MIMO transmission according to the indication information after a fixed period of time. Each STA sends uplink data using a channel from itself to the AP. The AP may receive the uplink data sent by multiple STAs simultaneously through their respective channels, which ensures that there is no mutual interference between parallel data of the STAs.

Step 203, the AP demodulates the uplink data sent by the at least two STAs using receiving beams corresponding to pre-estimated channels from the at least two STAs to the AP, respectively.

The AP may pre-estimate the channels from the STAs to the AP respectively to distinguish the uplink data sent by the STAs before performing demodulation of the uplink data. The AP may use the pre-estimated channels from the STAs to the AP to form the receiving beams corresponding to channels respectively and perform demodulation of uplink data received from different STAs. The process that demodulating the uplink data received from different STAs by using the receiving beams corresponded to the channels respectively is similar to that in the prior art, which is not redundantly described herein.

In an embodiment of the present disclosure, the AP receives the uplink data from multiple STAs through different channels from the STAs to the AP respectively, and demodulates data using the receiving beams corresponding to the channels respectively, thereby realizing that the AP separates and demodulates the uplink data sent by multiple STAs and realizing the uplink multiuser data transmission.

In another embodiment of the present disclosure, when estimating the channels from the STAs to the AP, the AP may specifically determine the channels from the STAs to the AP according to information for performing channel estimation sent by the STAs, respectively. The AP may perform channel estimation after sending indication information to the at least two STAs, or may also perform channel estimation before sending the indication information to the at least two STAs.

Figure 3:
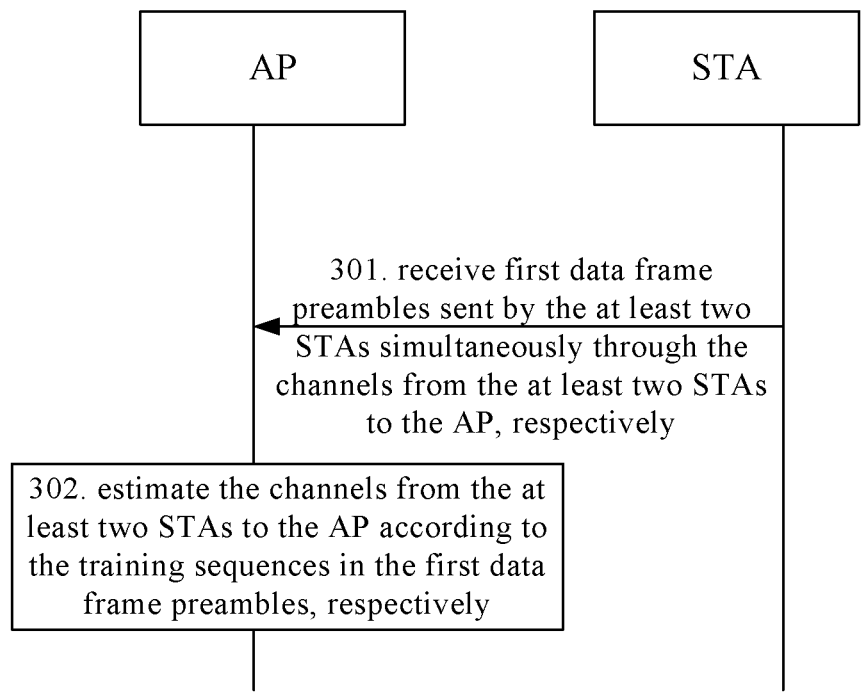
FIG. 3 is a flowchart of a method for channel estimation according to an embodiment of the present disclosure.

If the AP performs channel estimation after sending the indication information to the at least two STAs, as shown in FIG. 3, a method that the AP performs channel estimation may include:

Step 301, the AP receives first data frame preambles sent by the at least two STAs simultaneously through the channels from the at least two STAs to the AP, respectively.

The first data frame preamble includes a training sequence for channel estimation, wherein training sequences of the STAs are mutually orthogonal.

In a specific implementation, each STA may set the first data frame preamble in a same data frame with the uplink data of the STA in step 202. Before obtaining the uplink data of the data frame, the AP obtains the first data frame preamble in the data frame first, and further obtains the training sequence in the first data frame preamble, for performing estimation of the channel from the STA to the AP.

In the present embodiment, the training sequence in the first data frame preamble may be obtained by performing an orthogonal extension of a long training sequence (LTS or Long Training Field, LTF) in an existing data frame preamble in a time domain. Each STA has its own extended sequence, and extended sequences of the STAs are mutually orthogonal. A Walsh matrix or an existing P matrix or the like may be used for the orthogonal extension of the long training sequence, as long as it satisfies orthogonality.

Figure 4:
FIG. 4 is a schematic diagram of a first data frame preamble in the embodiment as shown in FIG. 3.

As shown in FIG. 4, it is a schematic diagram of a first data frame preamble. A short training field (STF) is used for synchronization and setting AGC (Automatic Gain Control). The AGC is mainly used for adjusting strength of receiving signals by a receiving end. An LTF is used for channel estimation for a SIG (signal) field, and the SIG is used for carrying indicating information of a physical layer. An L-SIG is a signal field in a traditional format and a UHT (Ultra High Throughput)-SIG-A is a signal field which supports UL MU-MIMO. A UHT-STF and a UHT-LTF are used for synchronization of data section of the UL MU-MIMO, AGC and channel estimation, respectively. Each LTF symbol of LTF1~LTFN is correspondingly multiplied by symbols of a orthogonal sequence with a length of N, thereby obtaining an orthogonal LTF, namely, the above-mentioned training sequence in the first data frame preamble. The orthogonal sequence may be multiple possible sequences, such as a line or a column of a Walsh matrix, for example, W(4), or also may be a P matrix, for example, P(4).

$$W(4) = \begin{bmatrix} 1 & 1 & 1 & 1 \\ 1 & 1 & -1 & -1 \\ 1 & -1 & -1 & 1 \\ 1 & -1 & 1 & -1 \end{bmatrix}$$

$$P(4) = \begin{bmatrix} 1 & -1 & 1 & 1 \\ 1 & 1 & -1 & 1 \\ 1 & 1 & 1 & -1 \\ -1 & 1 & 1 & 1 \end{bmatrix}$$

Since there is no mutual exchange of information between the STAs, the STAs may select to adopt orthogonal sequences which are longer than actual numbers of streams. For example, since all STAs know the number of antennas of a current AP, the number of antennas may be served as a length of the orthogonal sequences, or an even number which is greater than but closest to the number of antennas may be selected.

In another embodiment, LTF sequences may be redesigned to make the training sequences in the first data frame preambles sent by STAs are mutually orthogonal. These LTF sequences need to satisfy the following conditions:

LTF sequences of different STAs are maintained to be orthogonal or quasi-orthogonal, namely, for a present STA, a weighted sum is maximized and for other STAs, a weighted sum is zero or close to zero;

an AP may estimate channel information effectively according to the LTF.

For an LTF set based on this standard, it is no longer need to perform the above-mentioned orthogonal extension of the LTF and UHT-LTF.

Step 302, the AP estimates the channels from the at least two STAs to the AP according to the training sequences in the first data frame preambles, respectively.

The AP obtains training sequences of LTF sections in the first data frame preambles, and then after the training sequences are weighted and summed so that each STA may be distinguished, and thus the channels from the STAs to the AP may be estimated.

For example, there are two STAs, and only two LTFs are needed: LTF1 and LTF2. It is taken as an example for illustration that an orthogonal extension of long training sequences in existing data frame preambles is performed in a time domain to obtain training sequences of first data frame preambles. An orthogonal sequence $[H^1; H^2]=[1\ 1; 1\ -1]$ is adopted, and respective orthogonal training sequences of the two STAs are obtained:

STA1: $LTF_1^1=LTF$, $LTF_2^1=LTF$
STA2: $LTF_1^2=LTF$, $LTF_2^2=-LTF$

1) A signal received by an AP end is a sum of signals of STA1 and STA2, wherein LTF section may be denoted as:

$H^1*[LTF_1^1,LTF_2^1]+H^2*[LTF_1^2,LTF_2^2]=H^1*[LTF, LTF]+H^2*[LTF,-LTF]=[(H^1+H^2)*LTF,(H^1-H^2)*LTF]$

2) The AP weights the received training sequences with [1, 1] and [1, −1], respectively.

$[(H^1+H^2)*LTF,(H^1-H^2)*LTF]$ $[(H^1+H^2)*LTF,(H^2-H^1)*LTF]$

Elements of weighted result vector are added to obtain products of STA1 and STA2's respective channel matrixes and the LTF, respectively.

$2*H^1*LTF$ $2*H^2*LTF$

3) The AP then use an existing method of channel estimation to perform channel estimation on the products of channel matrixes of STA1 and STA2 and the LTF obtained in 2), $2*H^1*LTF$, $2*H^2*LTF$, respectively, to obtain channel matrixes, for example, both multiply by or divide by an LTF sequence. The channel matrix is namely a receiving beam for demodulating uplink data in a next step.

After step 302, the AP may form receiving beams corresponding to the estimated channels according to the estimated channels respectively, and then demodulate the uplink data section in the data frames on the corresponding channels by using the receiving beams corresponding to the channels, respectively.

By means of the mutually orthogonal training sequences in the first data frame preambles sent by the STAs respectively, the present embodiment realizes that AP performs an estimation of the channels from the STAs to the AP, respectively, thereby realizing subsequent differentiation and demodulation of the uplink data of the STAs.

In the above embodiments, the STAs send the first data frame preambles to the AP simultaneously, and the AP realizes the differentiation of the STAs through the training sequences in the first data frame preambles respectively, and thus the channels from the STAs to the AP may be estimated.

Figures 5, 6:
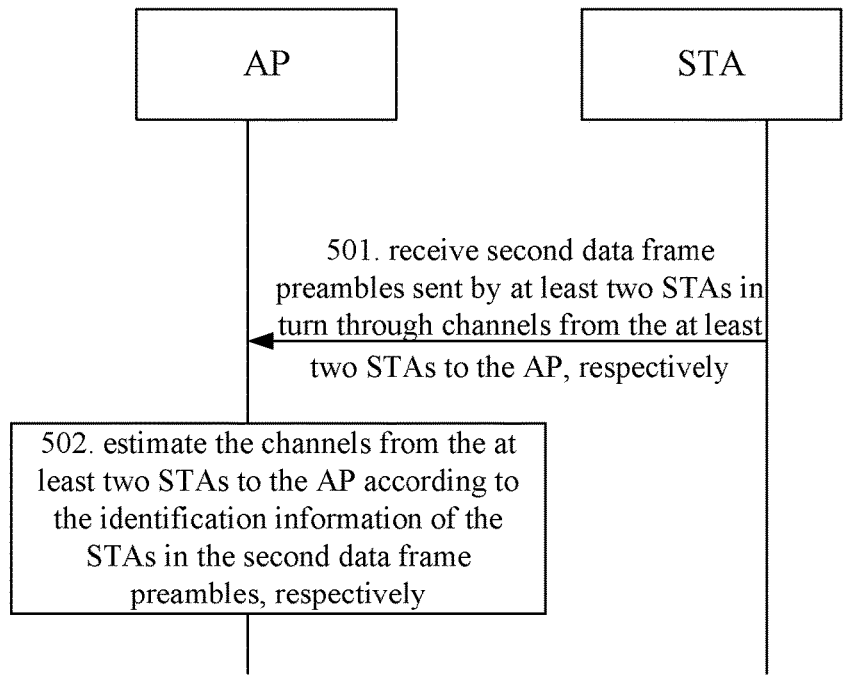
FIG. 5 is a flowchart of another method for channel estimation according to an embodiment of the present disclosure.
FIG. 6 is a schematic diagram of performing channel estimation according to the embodiment as shown in FIG. 5.

In another embodiment, as shown in FIG. 5, the method that the AP performs channel estimation may further include:

Step 501, the AP receives second data frame preambles sent by at least two STAs in turn through channels from the at least two STAs to the AP, respectively.

In the present embodiment, an existing data frame is split into a second data frame preamble and an uplink data section. As shown in FIG. 6, the STAs firstly send second data frame preambles to the AP in turn, and then send uplink data sections to the AP simultaneously after the AP estimates the channels from the STAs to the AP. Since the STAs send the second data frame preambles in turn, orthogonal training sequences need not to be included in the second data frame preambles. The second data frame preamble section may be the same as a preamble section of a data frame in the prior art. The second data frame preambles may include identification information of the STAs, so that the AP may estimate the channels from the STAs to the AP according to a sequence of receiving the second data frame preambles and the identification information of the STAs.

In a specific implementation, when sending the second data frame preambles, the STAs may merely send STFs and LTFs, which is to make the AP merely estimate channel information. In this case, uplink data sent by the STAs subsequently still need to carry SIG fields or the like as a signalling indication.

The AP may further send acknowledge information after receiving the second data frame preambles of the STAs, enabling the whole process to be more stable. Further, the AP may send request information (Poll) of the second data frame preambles one by one to the STAs, so as to reliably perform estimation of channels of the STAs.

Step 502, the AP estimates the channels from the STAs to the AP according to the identification information of the STAs in the second data frame preambles.

After determining the channels from the STAs to the AP, the AP may execute the foregoing step 202, and then receives uplink data sent by the STAs simultaneously.

According to the present embodiment, the STAs send the second data frame preambles and the uplink data section separately, and the STAs send the second data frame preambles in a time-sharing manner, so that an estimation of the AP on the channels from the STAs to the AP respectively is realized, thereby realizing subsequent differentiation and demodulation to the uplink data of the STAs.

In the above embodiments, "the second data frame preambles" and "the second data frame preambles" are merely for distinguishing different data frame preambles, rather than for any specific referring or limitation.

Figure 7:
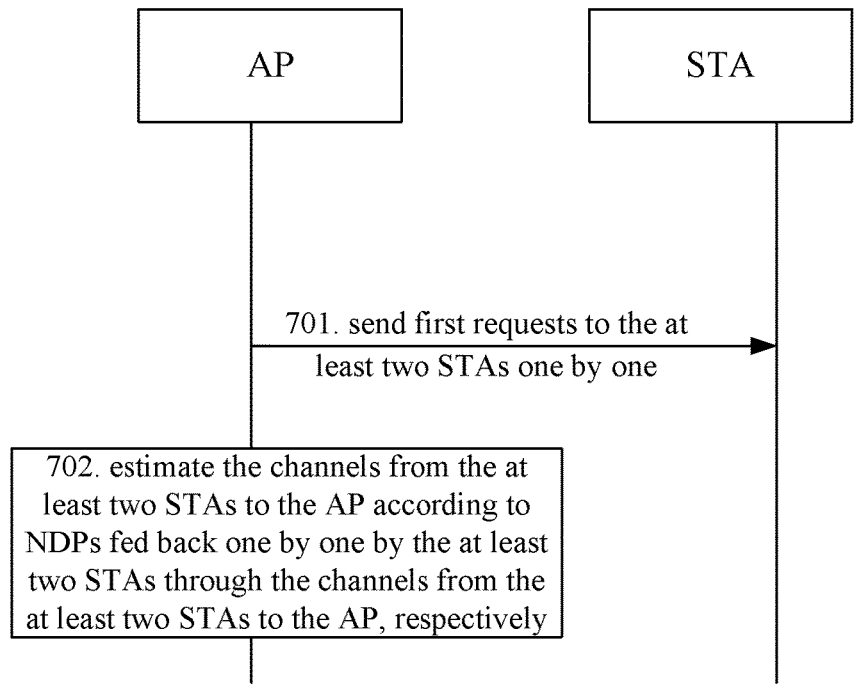
FIG. 7 is a flowchart of another method for channel estimation according to an embodiment of the present disclosure.

If the AP performs channel estimation before sending the indication information to the at least two stations STAs, as shown in FIG. 7, a method that the AP performs channel estimation may include:

Step 701, the AP sends a first request to the at least two STAs one by one, wherein the first request is used for indicating that the at least two STAs feed back null data packets (NDP) after receiving the request.

Figure 8:
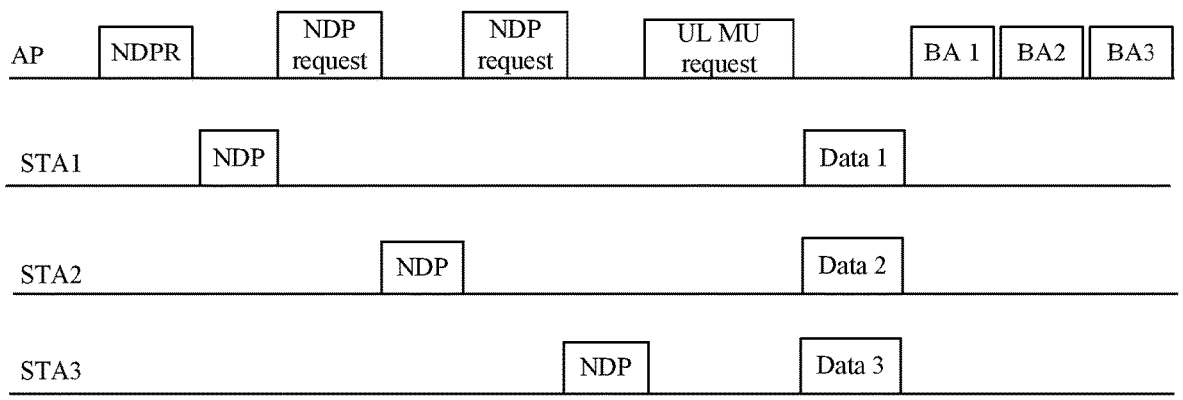
FIG. 8 is a schematic diagram of performing channel estimation according to the embodiment as shown in FIG. 7.

In a specific implementation, as shown in FIG. 8, the AP may send an NDPR as the first request, for indicating one STA of the at least two STAs feeds back an NDP after a fixed period after the STA receives the NDPR. Then the AP send NDP Polls (request) as the first requests to other STAs one by one, and indicates the other STAs feed back NDPs after a fixed period upon receiving NDP Polls.

Figure 9:
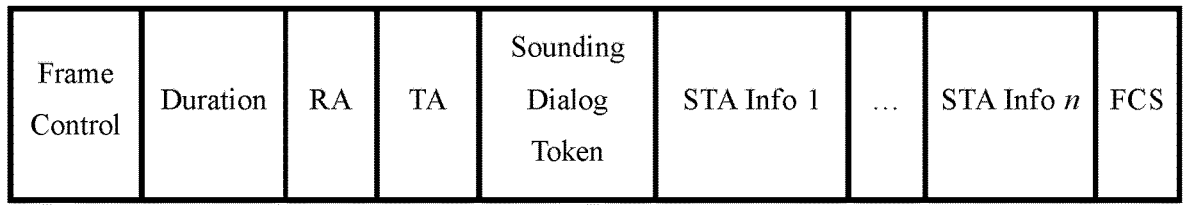
FIG. 9 is a schematic diagram of a format of an NDPA according to the embodiment as shown in FIG. 7.

In the present solution, the NDPR needs to indicate an list of STAs which sends the NDP this time. A specific implementation manner may be to reuse a format of an NDPA (NDP Announcement). As shown in FIG. 9, the NDPA may include the following fields: a frame control, a duration, a receive address (RA), a transmission address (TA), a channel sounding dialog token, station information 1~n (STA info1~n) and a frame check sequence (FCS), and one information bit (such as a reserved bit in the Sounding Dialog Token (channel sounding dialog token)) in the format is used to indicate whether the frame is an NDPA or an NDPR.

An NDP Poll is a new Poll frame, or it may also reuse a format of a Beamforming Report Poll and use an information bit to indicate its handover. In addition, an NDP needs to carry information of a sending STA, and even include information of the sending STA and a receiving AP.

Step 702, the AP estimates the channels from the at least two STAs to the AP according to NDPs fed back one by one by the at least two STAs through the channels from the at least two STAs to the AP, respectively.

After receiving the NDPs fed back one by one by STAs, the AP may determine the channels from the at least two STAs to the AP according to a feedback sequence or time of the NDPs, or information of the STAs carried in the NDPs, respectively.

After determining the channels from the at least two STAs to the AP, the AP may execute the above step 202.

According to the present embodiment, the AP sends the first requests one by one to the STAs, so that the AP may estimate the channels from the at least two STAs to the AP according to the NDPs fed back one by one by the STAs respectively, thereby realizing subsequent differentiation and demodulation of the uplink data of the STAs.

Figure 10:
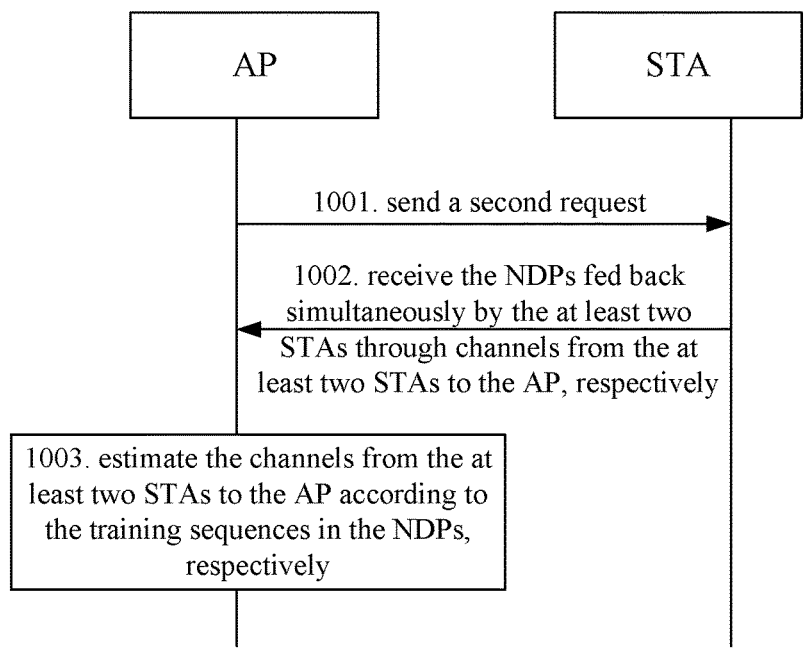
FIG. 10 is a flowchart of another method for channel estimation according to an embodiment of the present disclosure.

In another embodiment, as shown in FIG. 10, the method that the AP performs channel estimation may further include:

Step 1001, the AP sends a second request, wherein the second request is used for indicating that the at least two STAs feed back NDPs simultaneously after receiving the second request.

Figure 11:
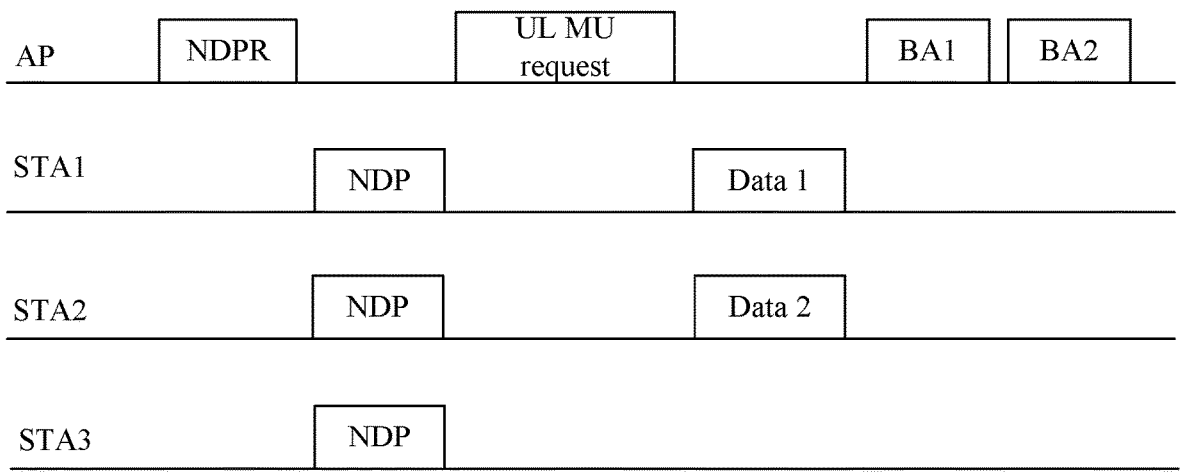
FIG. 11 is a schematic diagram of performing channel estimation according to the embodiment as shown in FIG. 10.

In the present embodiment, the AP may take NDPRs as the second request, for indicating that multiple STAs feed back NDPs simultaneously after receiving the NDPR, as shown in FIG. 11. The advantage of doing like this is that the AP may not only estimate channel information between the AP and the at least two STAs, but also may estimate mutual interference information in advance when the STAs send data simultaneously.

Step 1002, the AP receives the NDPs fed back simultaneously by the at least two STAs through channels from the at least two STAs to the AP, respectively, and the NDP includes a training sequence for channel estimation, wherein training sequences of the at least two STAs are mutually orthogonal.

After receiving the NDPR, the STAs send NDPs to the AP simultaneously at a fixed time, and the AP performs estimation of channels from the at least two STAs to the AP according to the NDPs indicated by the NDPRs and sent by all STAs. The NDPs fed back by the STAs include training sequences for channel estimation respectively, and the training sequences of the STAs are mutually orthogonal.

Step 1003, the AP estimates the channels from the at least two STAs to the AP according to the training sequences in the NDPs, respectively.

After weighting and summing the training sequences, the AP may distinguish the STAs, and thus estimate the channels from the STAs to the AP.

For example, a training sequence which is mutually orthogonal and can be used to estimate channel is $S=[s_k]$, and $s_k$ is the Kth sequence.

Mutual orthogonality means that $s_k's_k=C$, and C is a constant; and $s_k's_l=0$, or $s_k's_l \to 0$, $k \neq l$, s' denotes conjugate transposition of vector s.

The sequence received by the AP passes through channel $h_k$: $h_k \bullet s_k$; if there are two STAs send simultaneously, the sequence received by the AP is: $h_k \bullet s_k + h_l \bullet s_l$, wherein $h_k$ is the channel passed by the sequence $s_k$, "•" denotes a point multiplication.

Here weighting and summing refers to multiplying elements of a known sequence by elements of a received sequence and perform summing. In other words, an inner product of a known sequence and a received sequence is calculated: $s_i'[h_k \bullet s_k + h_l \bullet s_l]$, i=k or i=l.

In the foregoing embodiments, if the LTF sequence is redesigned to make the training sequences in the first data frame preambles sent by the STAs be mutually orthogonal, the process of weighting and summing of the training sequences when step 302 is executed may also be similar to the process of weighting and summing in step 1003.

When performing channel estimation, the AP may further estimate interferences probably produced due to simultaneous sendings by the STAs. The AP may select to take the estimation of interferences as a basis for scheduling subsequent UL MU MIMO transmission, and an example is shown in FIG. 11. The AP selects to bring STA1 and STA2 into a scope of the UL MU MIMO transmission in UL MU Poll frames according to estimated interference condition, and STA3 is excluded.

Figure 12:
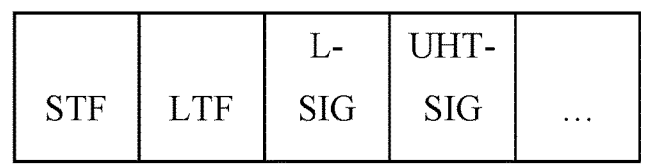
FIG. 12 is a schematic diagram of a simplified UL MU-MIMO data frame preamble according to the embodiment as shown in FIG. 10.

Moreover, since the AP has obtained all channel information through the NDPs, the AP may form receiving beams while scheduling the STAs. Thus channel information of scheduled STAs does not need to be known in subsequent uplink data transmission. In this way the structure of a data frame sent by STAs subsequently may be further simplified. For example, LTFs in data frame preambles of Data1 and Data2 in FIG. 11 may be removed, as shown in FIG. 12, and removal of redundant LTF can greatly improve system efficiency.

According to the present embodiment, mutually orthogonal training sequences are increased in the NDPs sent by the at least two STAs simultaneously, which realizes that the AP performs estimation of the channels from the at least two STAs to the AP, thereby realizing subsequent differentiation and demodulation of the uplink data of the STAs.

In another embodiment of the present disclosure, after an AP performs demodulation of uplink data sent by the STAs, the method may further include:

the AP replys acknowledge information to the at least two STAs after demodulating the uplink data sent by the at least two STAs.

Figure 13A:
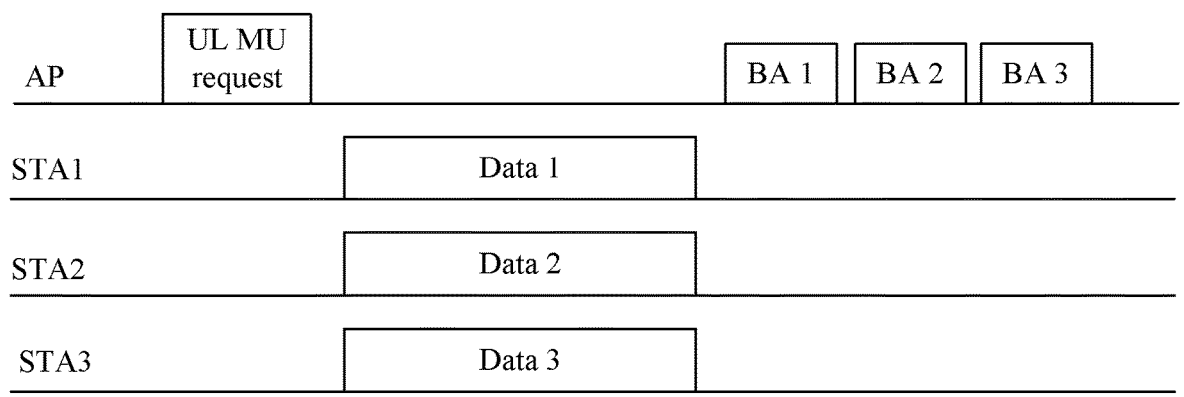
FIGS. 13a~13b are schematic diagrams that an AP replys acknowledge information according to an embodiment of the present disclosure.
Figure 13B:
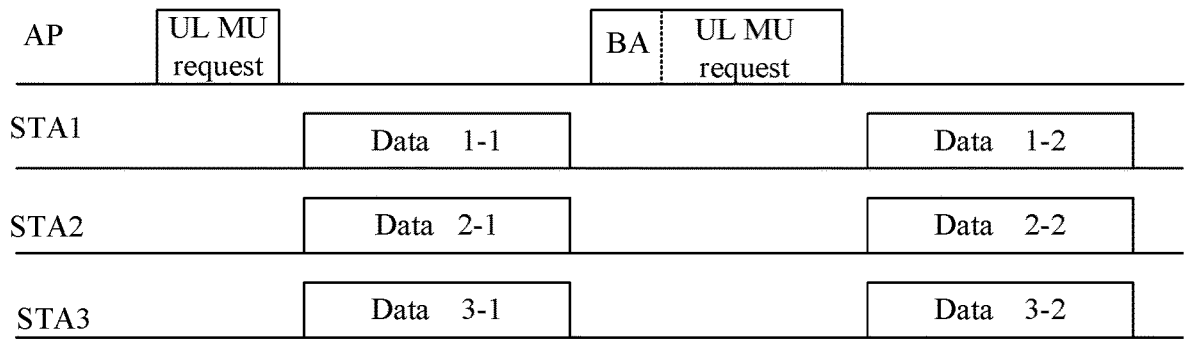

There may be multiple manners that the AP replys the acknowledge information. One of the manners is shown in FIG. 13a, the AP replys to the STAs in a time-sharing manner; it may also be that the AP carries addresses of multiple STAs and bitmap of sections of each STA in a new frame format to indicate whether data sent by the STAs is correctly received; the acknowledge information may also be carried within a next UL MU Poll frame, as shown in FIG. 13b, wherein failing to receive some of data or completely failing to receive the data or completely receiving the data correctly will be reflected in the bitmap (BA) of a UL MU Poll frame of the next frame data. It should be noted that, if the data is completely received correctly, the next UL MU Poll may be no longer selected to carry the acknowledge information but consider the data has been completely received correctly by default. Further, if the data transmission is the last frame of each STA in the TXOP, the AP will not send the UL MU Poll to reflect acknowledge of receiving in the case that the data is completely received correctly.

In the present disclosure, UL MU-MIMO data transmission is performed within the TXOP initiated by the AP, and thus the AP is a TXOP holder of this UL MU-MIMO sending. Therefore, an access category (AC) to which the TXOP belongs is the AC of a channel contended by the AP. Further, in the TXOP, the AP may give priority to select an STA of which scheduling service category is the same as the AC to which the present TXOP belongs as a primary STA, and a transmission is considered to be successful only if all of or part of services of the primary STA are transmitted successfully.

In another embodiment of the present disclosure, before an AP sends indication information to at least two STAs, the method may further include:

the AP determines STAs which need to perform an uplink data transmission from multiple STAs as the at least two STAs.

That is, the AP firstly determines which STAs need to perform the uplink data transmission, and then sends indication information to these STAs which need to perform the uplink data transmission.

Figure 14:
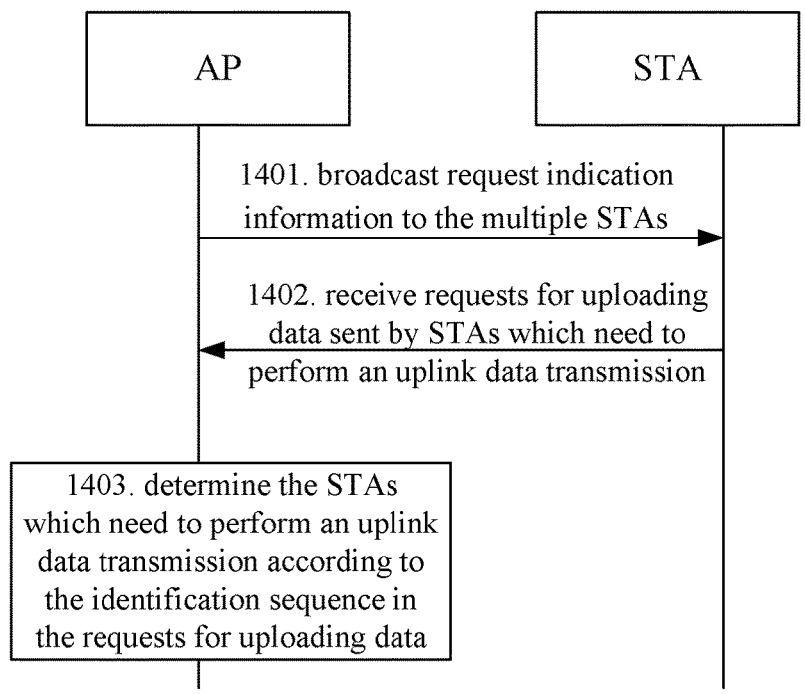
FIG. 14 is a flowchart of a method that an AP determines STAs need to perform an uplink data transmission from multiple STAs according to an embodiment of the present disclosure.

An shown in FIG. 14, a method that the AP determines the STAs which need to perform the uplink data transmission from multiple STAs may include:

Step 1401, the AP broadcasts request indication information to the multiple STAs, wherein the request indication information is used for indicating that the STAs which need to perform the uplink data transmission in the multiple STAs send requests for uploading data to the AP.

Figure 15:
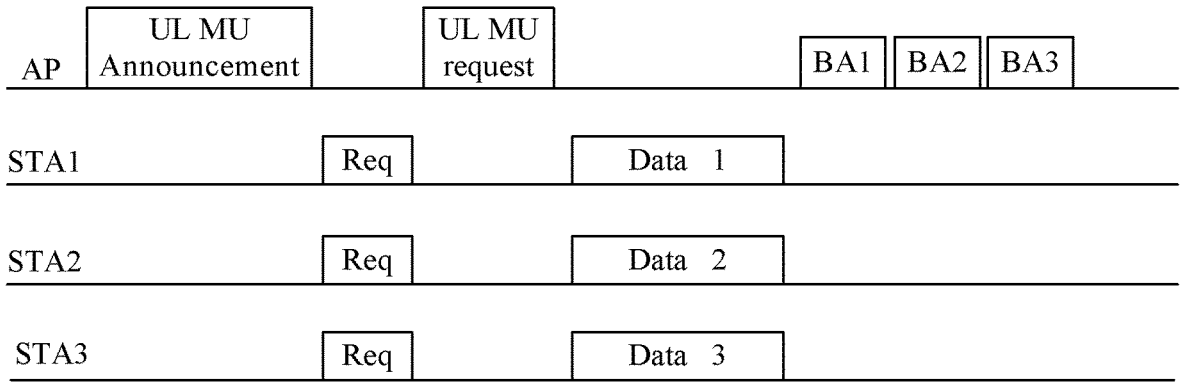
FIG. 15 is a schematic diagram of determining STAs need to perform an uplink data transmission as show in FIG. 14.

An shown in FIG. 15, the AP may broadcast request sending an indication frame (UL MU Announcement, uplink multiuser announcement) to the multiple STAs, and the request indication information is carried in the frames to indicate that the STAs which need to perform the uplink data transmission initiate UL MU-MIMO requests respectively.

Step 1402, the AP receives the requests for uploading data sent by the STAs which need to perform an uplink data transmission, wherein the requests for uploading data include identification sequences for uniquely identifying the STAs which need to perform an uplink data transmission, and identification sequences of the STAs which need to perform an uplink data transmission are mutually orthogonal.

After receiving UL MU Announcements, the STAs which need to perform an uplink data transmission initiate UL MU-MIMO requests Reqs respectively, as shown in FIG. 15. In order to facilitate that the AP determines which STAs need to perform the uplink data transmission, identification sequences for uniquely identifying the STAs may be included in the requests when the STAs initiate the UL MU-MIMO requests respectively, and identification sequences of the STAs are mutually orthogonal. The identification sequences of the STAs may be orthogonal sequences in a time domain or in a frequency domain.

Step 1403, the AP determines the STAs which need to perform an uplink data transmission according to the identification sequences.

After receiving UL MU-MIMO requests of the STAs, the AP can determine which STAs have data sending request of the UL MU-MIMO by weighting and suming the identification sequences in the requests.

The process that the AP weights and sums the identification sequences in the requests is similar to the weighting and summing process in the foregoing embodiments, which is not redundantly described herein.

In order to maintain continuous sendings, a fixed interframe space such as SIFS may be maintained between a UL MU Announcement frame and a Req frame as well as between the subsequent frames.

According to the present embodiment, the AP broadcasts the indication information, and determine the STAs which need to perform an uplink data transmission according to the requests fed back by the STAs, so that the AP may indicate the uplink data transmission only for the STAs which need to perform an uplink data transmission.

Figure 16:
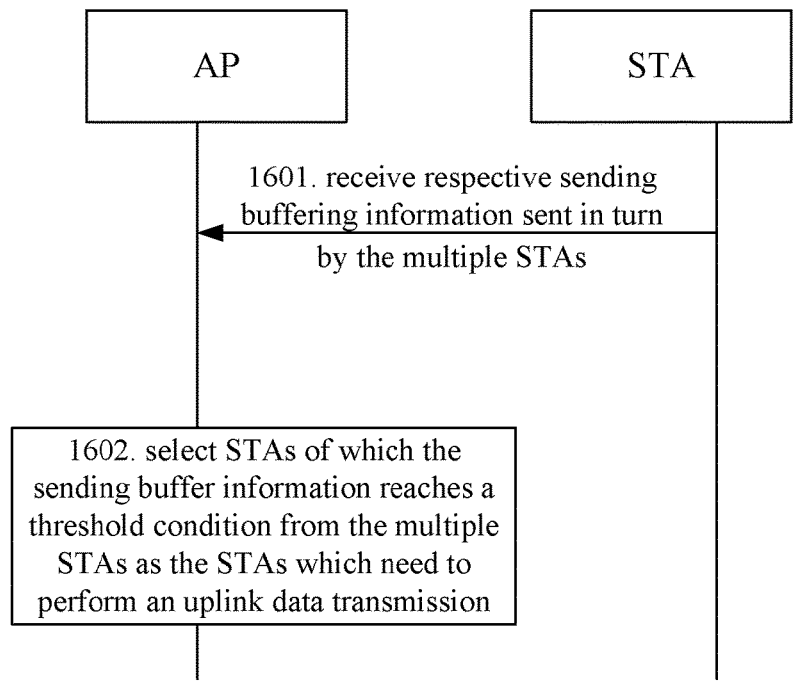
FIG. 16 is a flowchart of another method that an AP determines STAs need to perform an uplink data transmission from multiple STAs according to an embodiment of the present disclosure.

The method that the AP determines STAs which need to perform an uplink data transmission within multiple STAs, as shown in FIG. 16, may further include:

Step 1601, the AP receives their respective sending buffer information sent in turn by the multiple STAs.

The sending buffer information of the STAs reflects accumulation of sending demand. Specifically it is a length of data within the current buffer.

Figure 17:
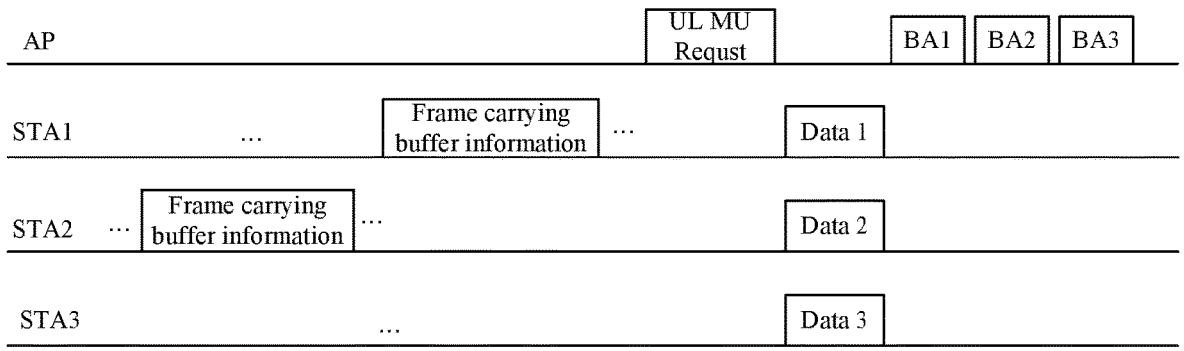
FIG. 17 is a schematic diagram that STAs send their respective sending buffer information according to an embodiment of the present disclosure.
Figure 18:
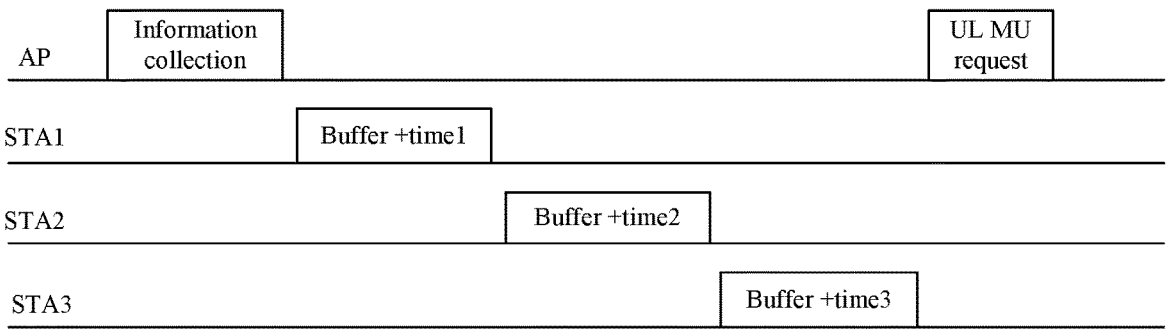
FIG. 18 is another schematic diagram that STAs send their respective sending buffer information according to an embodiment of the present disclosure.

In the step, the STAs may carry current sending buffer information thereof in the sent data, as shown in FIG. 17, or the AP may firstly request the STAs to send their respective sending buffer information in turn before indicating that the STAs perform the UL MU-MIMO sending, as shown in FIG. 18.

In addition to the sending buffer information, current backoff Time of the STAs is also information that reflects demand of the STAs on channel access and data sending, and information such as hidden node, channel correlation, interference and the like may be sent to the AP together by the STAs, so as to facilitate the AP to perform scheduling.

For QoS STAs, their sending buffer information is divided into four access categories according to service category: voice (AC_VO), video (AC_VI), best effort (AC_BE) and background (AC_BG). The sending buffer information may be subdivided according to the four categories, namely, data lengths of respective access categories are reported to the AP.

Step 1602, the AP selects STAs of which the sending buffer information reaches a threshold condition from the multiple STAs as the STAs which need to perform an uplink data transmission.

After receiving the sending buffer information of the STAs, the AP may take data situations of the STAs as a basis for determining whether to use UL MU-MIMO for transmission. The threshold condition may be set as needed, for example, a certain data volume may be set, and when data volume in the sending buffer information of an STA reaches the set data volume, the STA is taken as an STA which need to perform an uplink data transmission, otherwise the STA is not included in the STAs which need to perform an uplink data transmission.

In the present embodiment, the AP determines the STAs which need to perform an uplink data transmission according to the sending buffer information of the STAs, so that the AP may indicate the uplink data transmission only for the STAs which need to perform an uplink data transmission.

In another embodiment of the present disclosure, the UL MU-MIMO process may be determined and initiated by an AP according to a current scenario, also may be determined and initiated by an STA according to a current scenario.

Figure 19:
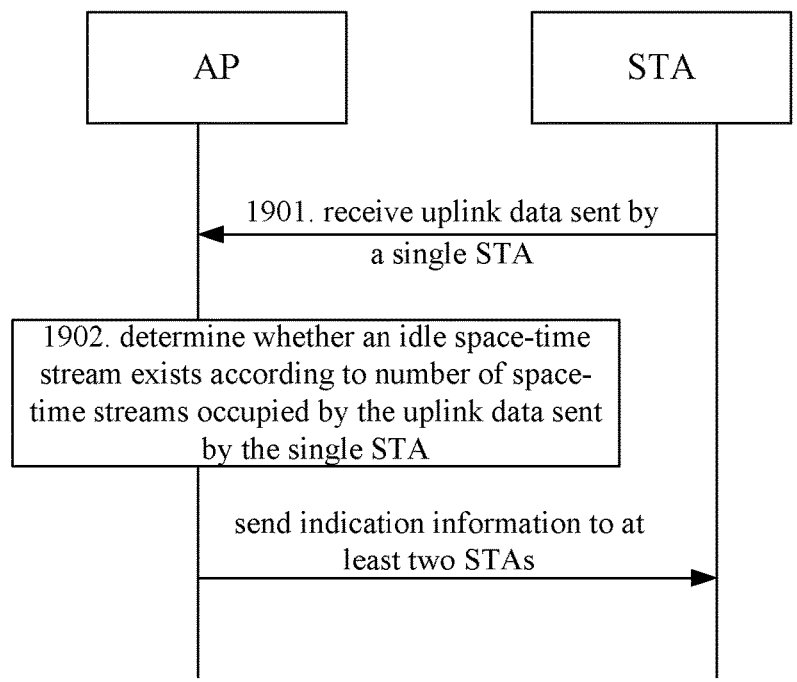
FIG. 19 is a flowchart of a method that an AP initiates a UL MU-MIMO process according to an embodiment of the present disclosure.

As shown in FIG. 19, in a scenario that an AP initiates a UL MU-MIMO process, before the AP sends indication information to at least two STAs, the method further includes:

Step 1901, the AP receives uplink data sent by a single STA.

Figure 20:
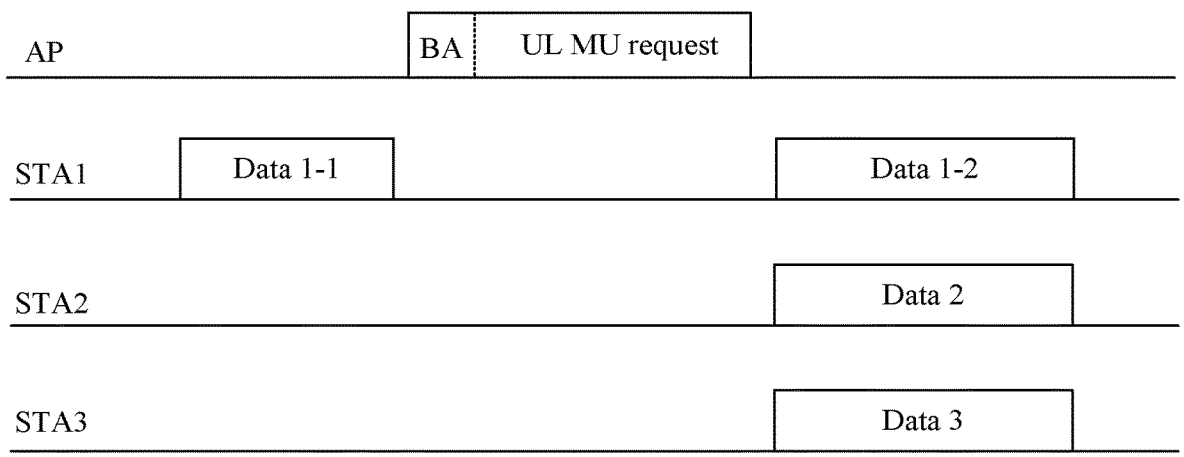
FIG. 20 is a schematic diagram that an AP initiates a UL MU-MIMO process as shown in FIG. 19.

Before the AP initiates the UL MU-MIMO process, the single STA sends uplink data to the AP, and as shown in FIG. 20, only STA1 sends uplink data to the AP.

Step 1902, the AP determines whether an idle space-time stream exists according to number of space-time streams occupied by the uplink data sent by the single STA; if yes, the AP executes a step of sending indication information to at least two STAs.

After receiving a data frame of uplink data sent by the STA, if it is determined that currently idle resources still exist according to number of space-time streams occupied by the data frame, that is, certain spatial resource waste exist in current space-time stream of the AP, the AP may execute the foregoing step 201. The AP sends indication information to other STAs through a UL MU Poll to indicate that multiple STAs perform an uplink data transmission simultaneously, so as to initiate the UL MU-MIMO process, as shown in FIG. 20.

Specifically, as shown in FIG. 20, the AP may carry a UL MU Poll to indicate that STA2 and STA3 performs an uplink data transmission at the same time within remaining time in the TXOP when replying acknowledge information to the above STA1. STA2 and STA3 join UL MU-MIMO transmission after receiving the indication. In a frame format, the AP needs to indicate information such as STAs which subsequently join the UL MU-MIMO transmission and duration and service category of the transmission or the like in the UL MU Poll. In addition, STA1 may change a format of the sent data from a format for a single user to a format for supporting the UL MU-MIMO transmission after receiving the UL MU Poll. Data 1-1 denotes the first data of STA1, and Data 1-2 denotes the second data of STA1.

Figure 21:
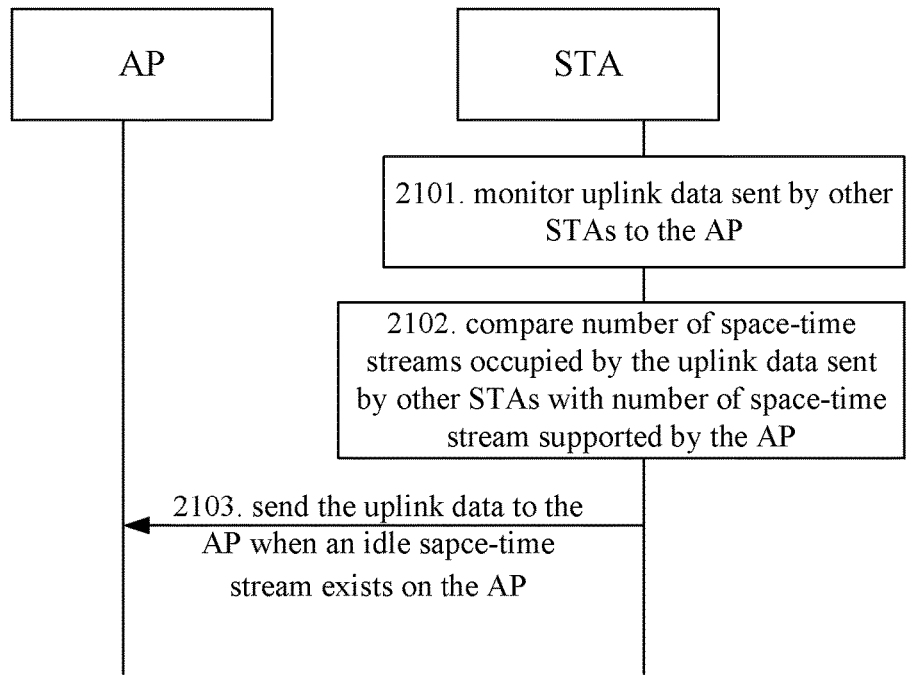
FIG. 21 is a flowchart of a method that STAs initiate a UL MU-MIMO process according to an embodiment of the present disclosure.

As shown in FIG. 21, in a scenario that an STA initiates a UL MU-MIMO process, before the AP sends indication information to at least two STAs, the method further includes:

Step 2101, the STA monitors uplink data sent by other STAs to the AP.

The STA may receive and read data from the other STAs.

Figure 22:
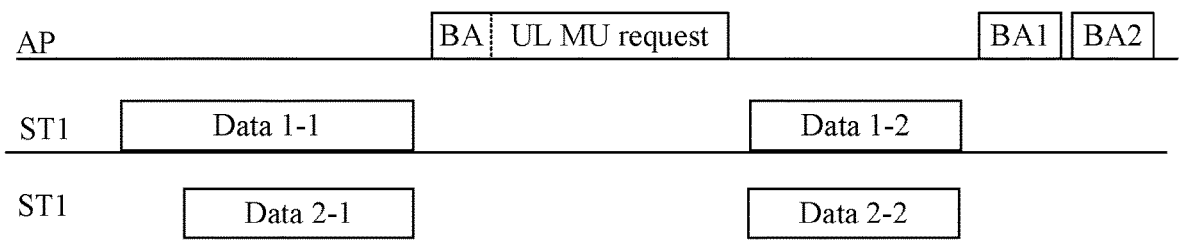
FIG. 22 is a schematic diagram that STAs initiate a UL MU-MIMO process as shown in FIG. 21.

As shown in FIG. 22, STA2 monitors uplink data that STA1 sends to the AP.

Step 2102, the STA compares number of space-time streams occupied by the uplink data sent by other STAs with number of space-time streams supported by the AP.

The STA may obtain capacity of the AP through capability negotiation and the capability negotiation may be carried in beacon frame broadcasting, or association, reassociation, interaction of management frame/data frame between the STA and the AP.

Step 2103, the STA sends the uplink data to the AP when an idle space-time stream exists on the AP.

When STA2 determines that the idle space-time stream still exists on the AP, the STA2 initiates an uplink data transmission, and the transmission may be called as piggyback transmission. In order to enable the AP to obtain and demodulate data of the STA2 accurately, sending of a data frame of the STA2 needs to satisfy the following conditions:

A format of the frame needs to adopt an orthogonal or quasi-orthogonal design, for example, the orthogonal LTF in the foregoing embodiments, that is, LTF sections in data frames sent by STA2 and STA1 are mutually orthogonal. In this way the AP may distinguish the data frame of the STA2 and form a specific receiving beam.

The sending of STA2 shall keep synchronization with that of STA1 at a symbol level, specifically, achieving a synchronization on OFDM symbols, that is, when signals sent by STA1 and STA2 arrive at the AP respectively, a difference in time delay between corresponding OFDM symbols thereof does not exceed a length of cycle prefix (CP), that is, difference of time when STA1 and STA2 arrive at the AP is within a scope of CP. Since if the difference in time delay between OFDM symbols exceeds the length of the cycle prefix, overlay of strong interferences will be caused, and since these OFDM symbols carry different information, they fails to be demodulated. In this way difference of time when STA1 and STA2 arrive at the AP is within a scope of CP, and thus the AP may avoid interference caused by out-of-sync of the OFDM symbols and demodulate signals effectively.

End time of a data frame sent by STA2 can not exceed end time of that of STA1, so as to avoid that subsequent acknowledge information (ACK) conflicts or causes error operations of STAs.

In order to avoid that multiple STAs want to join UL MU-MIMO to send data, a mechanism of random access may be introduced in STA side.

Specifically, each STA generates a random number within a range of [0, MU_limit] while monitoring that there is data starting to be sent in a channel, wherein value of the MU_limit may be set as the number of antennas of the AP.

An STA monitors data of a new STA and demodulates information about number of streams of the new STA. If there is still a redundant space-time stream currently, 1 is subtracted from the random number (since each STA adopts a orthogonal sequence, the STA may still monitor an existence of data of other STAs in the case that the channel is busy).

When the random number is reduced to 0 and there is still a redundant space-time stream currently, the STA may initiate an uplink data transmission. Through a process that the random number is reduced progressively, mutual conflict caused by mutiple STAs performing simultaneous sendings in a UL MU MIMO manner is avoided.

Groups may also be formed and it is specified that only other STAs in a group may initiate an transmission together with a STA which is currently performing sending in the group. For example, STA1 and STA2 are in a same group, and when STA1 performs sending, only STA2 may join common transmission with STA1.

The above method embodiments take an AP side as an executive body to realize the multiuser uplink data transmission, and a method that takes an STA side as an executive body to realize the multiuser uplink data transmission will be illustrated below.

Figure 23:
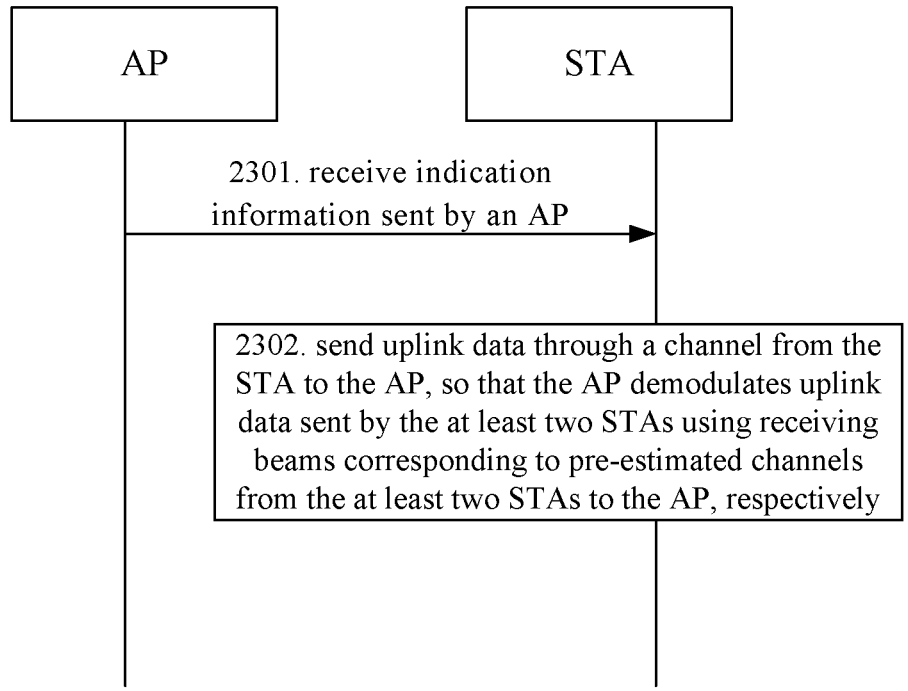
FIG. 23 is a flowchart of another method for a multiuser uplink data transmission according to an embodiment of the present disclosure.

Referring to FIG. 23, it is a flowchart of another method of a multiuser uplink data transmission in an embodiment of the present disclosure.

The method may include:

Step 2301, an STA receives indication information sent by an AP, wherein the indication information is used for indicating that at least two STAs which include the STA perform an uplink multiuser data transmission.

Step 2302, the STA sends uplink data through a channel from the STA to the AP, so that the AP demodulates uplink data sent by the at least two STAs using receiving beams corresponding to pre-estimated channels from the at least two STAs to the AP, respectively.

In the embodiment of the present disclosure, the AP receives uplink data of multiple STAs through different channels from the STAs to the AP, and adopts receiving beams corresponding to each of channels to demodulate data, thereby realizing that the AP performs separation and demodulation of the uplink data sent by multiple STAs and realizing the uplink multiuser data transmission.

In another embodiment of the present disclosure, after the STA receives indication information sent by the AP, the method further include:

the STA sends information for performing channel estimation to the AP, so that the AP estimates the channel from the STA to the AP according to the information for performing channel estimation.

A first manner: a process that the STA sends information for performing channel estimation to the AP specifically may be: the STA sends a first data frame preamble through the channel from the STA to the AP, the first data frame preamble including a training sequence for channel estimation, wherein the at least two STAs send respective first data frame preambles simultaneously, and training sequences of the at least two STAs are mutually orthogonal.

A second manner: a process that the STA sends information for performing channel estimation to the AP may also be: the STA sends a second data frame preamble through the channel from the STA to the AP, wherein the at least two STAs send respective second data frame preambles in turn, and the second data frame preambles of the at least two STAs include identification information thereof.

In another embodiment of the present disclosure, before the STAs receives indication information sent by the AP, the method further include:

the STAs send information for performing channel estimation to the AP, so that the AP estimates the information from the STAs to the AP according to the information for performing channel estimation.

A first manner: a process that the STAs send information for performing channel estimation to the AP specifically may include:

the STA receives first requests sent by the AP to the at least two STAs one by one, wherein the first requests are used for indicating that the at least two STAs feed back null data packets NDPs after receiving the requests, respectively;

the STAs feed back NDPs through the channels from the STAs to the AP.

A second manner: a process that the STAs send information for performing channel estimation to the AP may also include:

the STAs receives a second request sent by the AP, wherein the second request is used for indicating that the at least two STAs feed back NDPs simultaneously after receiving the request;

the STAs feed back NDPs through the channels from the STAs to the AP, the NDP including a training sequence for channel estimation, wherein training sequences of the at least two STAs are mutually orthogonal.

In another embodiment of the present disclosure, the method may further include:

the STAs receives acknowledge information replyed by the AP after the uplink data sent by the STAs is demodulated.

In another embodiment of the present disclosure, before the STAs receives indication information sent by the AP, the STAs may further send information to the AP, so that the AP select STAs which perform multiple uplink data transmission from mutiple STAs, and the method may be:

a first manner:

the STAs receive request indication information broadcasted by the AP, wherein the request indication information is used for indicating that STAs which need to perform an uplink data transmission in the multiple STAs send a request for uploading data to the AP;

When an STA needs to perform an uplink data transmission, the STA sends a request for uploading data to the AP, wherein the request for uploading data includes an identification sequence for uniquely identifying the STA, and identification sequences of the STAs which need to perform an uplink data transmission are mutually orthogonal.

A second manner: the STAs send sending buffer information thereof to the AP, so that the AP selects STAs of which sending buffer information reaches a threshold condition from the multiple STAs as the STAs which need to perform an uplink data transmission.

In another embodiment of the present disclosure, the UL MU-MIMO process may be determined and initiated by an AP according to a current scenario, may also be determined and initiated by an STA according to a current scenario.

If the AP initiate the UL MU-MIMO process in a scenario that a single STA sends uplink data, after the STA receives indication information sent by the AP, the method further include:

the STA changes a format for sending data to a transmission format which supports uplink multiuser multiple input multiple output, and then executes a step of sending, by the STA, uplink data through a channel from the STA to the AP.

If an STA determines and initiates a UL MU-MIMO process according to current scenario, before the STA receives indication information sent by the AP, the method further include:

the STA monitors uplink data sent by other STAs to the AP;

the STA compares number of space-time streams occupied by the uplink data sent by other STAs with number of space-time streams supported by the AP;

the STA sends the uplink data to the AP when an idle space-time stream exists on the AP.

For the specific process of the above method embodiments that take an STA side as an executive body, please refer to the foregoing method embodiments that take an AP side as an executive body, which is not redundantly described herein.

The embodiments of the present disclosure provide multiple solutions and uplink multiuser MIMO may be applied to a current wireless communication system which obtains a right to use a channel based on a contention manner.

The method embodiments of the present disclosure are described above, and a device and a system for implementing the above methods will be introduced below.

Figure 24:
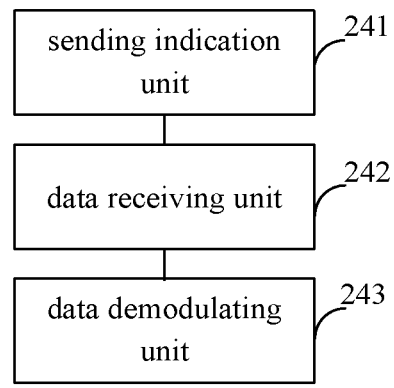
FIG. 24 is a schematic diagram of a structure of an access device according to an embodiment of the present disclosure.

FIG. 24 is a schematic diagram of a structure of an access device in an embodiment of the present disclosure.

The access device may include:

a sending indication unit 241, configured to send indication information to at least two stations STAs, wherein the indication information is used for indicating that the at least two STAs perform an uplink multiuser data transmission;

a data receiving unit 242, configured to receive uplink data sent by the at least two STAs through channels from the at least two STAs to the AP, respectively;

a data demodulating unit 243, configured to demodulate the uplink data sent by the at least two STAs using receiving beams corresponding to pre-estimated channels from the at least two STAs to the AP, respectively.

In the embodiment of the present disclosure, the AP realizes that AP perform separation and demodulation of the uplink data sent by multiple STAs through above units, and thus realizes uplink multiuser data transmission.

In another embodiment of the present disclosure, the access device may include a first channel estimation unit, which is configured to estimate the channels from the at least two STAs to the AP according to information for performing channel estimation sent by the at least two STAs after the sending indication unit sends the indication information to the at least two STAs, respectively.

In a first implementation manner, the first channel estimation unit may include:

a first receiving subunit, configured to receive first data frame preambles sent by the at least two STAs simultaneously through the channels from the at least two STAs to the AP, respectively, the first data frame preamble including a training sequence for channel estimation, wherein training sequences of the at least two STAs are mutually orthogonal;

a first determining subunit, configured to estimate the channels from the at least two STAs to the AP according to the training sequences in the first data frame preambles, respectively.

In a second implementation manner, the first channel estimation unit may include:

a second receiving subunit, configured to receive second data frame preambles sent by the at least two STAs in turn through the channels from the at least two STAs to the AP, respectively, wherein the second data frame preambles include identification information of the STAs;

a second determining subunit, configured to estimate the channels from the at least two STAs to the AP according to the identification information of the STAs in the second data frame preambles, respectively.

In another embodiment of the present disclosure, the access device may further include a second channel estimation unit, which is configured to estimate the channels from the at least two STAs to the AP according to information for performing channel estimation sent by the at least two STAs respectively before the sending indication unit sends the indication information to the at least two STAs.

In a first implementation manner, the second channel estimation unit may include:

a first sending subunit, configured to send a first request to the at least two STAs one by one, wherein the first request is used for indicating that the at least two STAs feed back null data packets NDPs after receiving the request, respectively;

a third determining subunit, configured to estimate the channels from the at least two STAs to the AP according to the NDPs fed back by the at least two STAs one by one through the channels from the at least two STAs to the AP, respectively.

In a second implementation manner, the second channel estimation unit may include:

a second sending subunit, configured to send a second request, wherein the second request is used for indicating that the at least two STAs feed back NDPs simultaneously after receiving the second request, respectively;

a feedback receiving subunit, configured to receive the NDPs fed back by the at least two STAs simultaneously through the channels from the at least two STAs to the AP, respectively, the NDP including a training sequence for channel estimation, wherein training sequences of the at least two STAs are mutually orthogonal;

a fourth determining subunit, configured to estimate the channels from the at least two STAs to the AP according to training sequences in the NDPs, respectively.

In another embodiment of the present disclosure, the access device may include an acknowledge replying unit, which is configured to reply acknowledge information to the at least two STAs after the uplink data sent by the at least two STAs is demodulated.

In another embodiment of the present disclosure, the access device may include a station determining unit, which is configured to determine STAs which need to perform an uplink data transmission from multiple STAs as the at least two STAs before the sending indication unit sends the indication information to the at least two STAs.

In a first implementation manner, the station determining unit may include:

a broadcasting subunit, configured to broadcast request indication information to the multiple STAs, wherein the request indication information is used for indicating that STAs which need to perform an uplink data transmission from the multiple STAs send requests for uploading data to the AP;

a request receiving subunit, configured to receive the request for uploading data sent by the STAs which need to perform an uplink data transmission, wherein the request for uploading data includes identification sequences for uniquely identifying the STAs which need to perform an uplink data transmission, and identification sequences of the STAs which need to perform an uplink data transmission are mutually orthogonal;

a first station determining subunit, configured to determine the STAs which need to perform an uplink data transmission according to the identification sequence.

In a second implementation manner, the station determining unit may include:

an information receiving subunit, configured to receive their respective sending buffer information sent by the multiple STAs in turn;

a second station determining subunit, configured to select STAs of which the sending buffer information reaches a threshold condition from the multiple STAs as the STAs which need to perform an uplink data transmission.

In another embodiment of the present disclosure, the access device may further include:

a single data receiving unit, configured to receive uplink data sent by a single STA before the sending indication unit sends the indication information to the at least two STAs;

a determining unit, configured to determine whether an idle space-time stream exists according to number of space-time streams occupied by the uplink data sent by the single STA; if yes, the AP executes a step of the sending indication information to at least two STAs.

Figure 25:
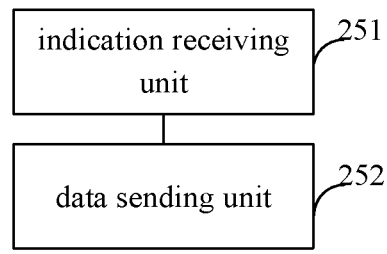
FIG. 25 is a schematic diagram of a structure of a station according to an embodiment of the present disclosure.

Referring to FIG. 25, it is a schematic diagram of a structure of a station in an embodiment of the present disclosure.

The station may include:

an indication receiving unit 251, configured to receive indication information sent by an access point AP, wherein the indication information is used for indicating that at least two STAs which include the STA perform an uplink multiuser data transmission;

a data sending unit 252, configured to send uplink data through a channel from the data sending unit to the AP, so that the AP demodulates uplink data sent by the at least two STAs using receiving beams corresponding to pre-estimated channels from the at least two STAs to the AP, respectively.

In another embodiment of the present disclosure, the station may further include a first information sending unit, which is configured to send information for performing channel estimation to the AP after the indication receiving unit receives the indication information sent by the AP, so that the AP estimates a channel from the STA to the AP according to the information for performing channel estimation.

Specifically, in one implementation manner, the first information sending unit is configured to send a first data frame preamble through a channel from the first information sending unit to the AP, the first data frame preamble including a training sequence for channel estimation, wherein the at least two STAs send respective first data frame preambles simultaneously, and training sequences of the at least two STAs are mutually orthogonal.

In another implementation manner, the first information sending unit is specifically configured to send a second data frame preamble through the channel from the first information sending unit to the AP, wherein the at least two STAs send their respective second data frame preambles in turn, and the second data frame preambles of the at least two STAs include identification information thereof, respectively.

In another embodiment of the present disclosure, the station may further include a second information sending unit, which is configured to send information for performing channel estimation to the AP before the indication receiving unit receives the indication information sent by the AP, so that the AP estimates information from the STA to the AP according to the information for performing channel estimation.

Specifically, in one implementation manner, the second information sending unit may include:

a first request receiving subunit, configured to receive a first request sent by the AP to the at least two STAs one by one, wherein the first request is used for indicating that the at least two STAs feed back null data packets NDPs after receiving the request, respectively;

a first feedback subunit, configured to feed back an NDP through the channel from the first feedback subunit to the AP.

In another implementation manner, the second information sending unit may include:

a second request receiving subunit, configured to receive a second request sent by the AP, wherein the second request is used for indicating that the at least two STAs feed back NDPs simultaneously after receiving the request, respectively;

a second feedback subunit, configured to feed back an NDP through the channel from the second feedback subunit to the AP, the NDP including a training sequence for channel estimation, wherein training sequences of at least two STAs are mutually orthogonal.

In another embodiment of the present disclosure, the station may further include an acknowledge receiving unit, which is configured to receive acknowledge information replied by the AP after the uplink data sent by the STA is demodulated.

In another embodiment of the present disclosure, the station may further include a broadcast receiving unit, which is configured to receive request indication information broadcasted by the AP before the indication receiving unit receives the indication information sent by the AP, wherein the request indication information is used for indicating that STAs which need to perform an uplink data transmission from the multiple STAs send a request for uploading data to the AP;

a request sending unit, configured to send the request for uploading data to the AP when an uplink data transmission needs to be performed, wherein the request for uploading data includes an identification sequence for uniquely identifying the STA, and identification sequences of the STAs which need to perform an uplink data transmission are mutually orthogonal.

In another embodiment of the present disclosure, the station may further include a buffer sending unit, which is configured to send sending buffer information thereof to the AP before the indication receiving unit receives the indication information sent by the AP, so that the AP selects STAs of which sending buffer information reaches a threshold condition from the multiple STAs as STAs which need to perform an uplink data transmission.

In another embodiment of the present disclosure, the station may further include a format changing unit, which is configured to change a format for sending data to a transmission format which supports uplink multiuser multiple input multiple output after the indication receiving unit receives the indication information sent by the AP, wherein the data sending unit then sends the uplink data through the channel from the data sending unit to the AP.

In another embodiment of the present disclosure, the station may further include a monitoring unit, which is configured to monitor uplink data sent by other STAs to the AP before the indication receiving unit receives the indication information sent by the AP;

a comparing unit, configured to compare number of space-time streams occupied by the uplink data sent by other STAs with number of space-time streams supported by the AP;

a carrying transmission unit, configured to send uplink data to the AP when an idle space-time stream exists on the AP.

Figure 26:
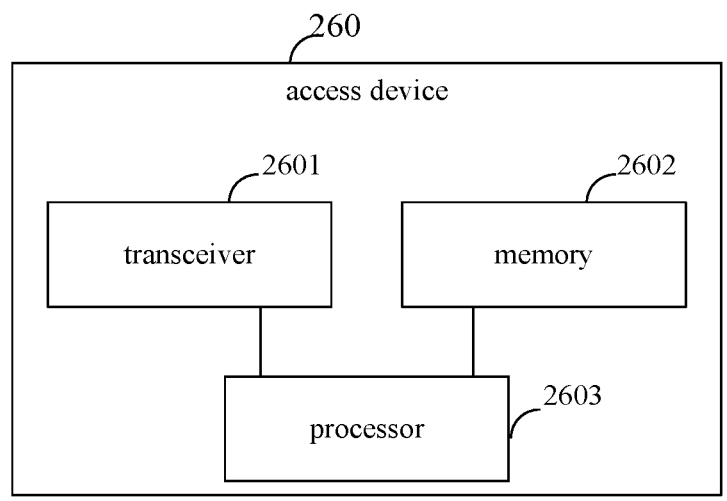
FIG. 26 is a schematic diagram of a structure of another access device according to an embodiment of the present disclosure.

As shown in FIG. 26, the embodiments of the present disclosure further provide an access device 260, wherein the access device includes a transceiver 2601, a memory 2602 and a processor 2603.

The transceiver 2601 is configured to send indication information to at least two stations STAs, wherein the indication information is used for indicating that the at least two STAs perform an uplink multiuser data transmission; and receive uplink data sent by the at least two STAs through channels from the at least two STAs to the AP, respectively.

The memory 2602 stores a program, and the processor 2603 is configured to read the program in the memory 2602 and execute the following step:

demodulating the uplink data sent by the at least two STAs using receiving beams corresponding to pre-estimated channels from the at least two STAs to the AP, respectively.

Figure 27:
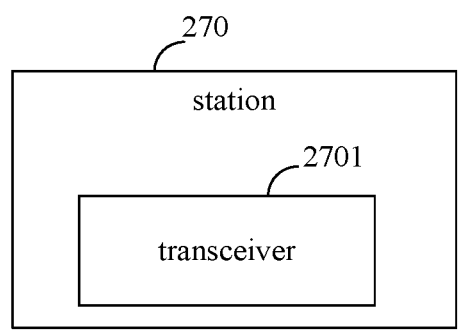
FIG. 27 is a schematic diagram of a structure of another station according to an embodiment of the present disclosure.

As shown in FIG. 27, the embodiments of the present disclosure further provide a station 270, including a transceiver 2701, which is configured to receive indication information sent by an access point AP, wherein the indication information is used for indicating that at least two STAs which include the STA perform an uplink multiuser data transmission; and send uplink data through a channel from it to the AP, so that the AP demodulates uplink data sent by the at least two STAs using receiving beams corresponding to pre-estimated channels from the at least two STAs to the AP, respectively.

The embodiments of the present disclosure further provide a system for multiuser data transmission, wherein the system may includes the access device and multiple stations as mentioned in the above embodiments.

According to the embodiments of the present disclosure, the AP receives the uplink data from multiple STAs through different channels from the STAs to the AP respectively, and demodulates data using the receiving beams corresponding to the channels respectively, thereby realizing that the AP perform separation and demodulation of the uplink data sent by multiple STAs and realizing the uplink multiuser data transmission.

Those of ordinary skill in the art may be aware that, units and algorithm steps of the examples described in the embodiments disclosed in this paper may be implemented by electronic hardware, computer software, or a combination of the two. Whether these functions are implemented in the form of hardware or software is determined by specific applications and design constraint conditions of the technical solutions. Those skilled may implement the described functions by using different methods for each specific application, but this implementation should not be considered as beyond the scope of the present disclosure.

Those skilled in the art to which the present disclosure pertains may clearly understand that, for convenience and simplicity of description, the specific working processes of the system, apparatus and units described above may refer to corresponding processes in the foregoing method embodiments, and will not be repeated redundantly herein.

In the several embodiments provided in the present application, it should be understood that, the disclosed system, apparatus and method may be implemented in other manners. For example, the apparatus embodiments described above are merely exemplary, e.g., the division of the units is only a logic function division, other division manners may exist in practical implementation, for example, multiple units or components may be combined or integrated to another system, or some features may be omitted or not implemented. In addition, the displayed or discussed mutual coupling or direct coupling or communication connection may be indirect coupling or communication connection through some interfaces, devices or units, and may be in electrical, mechanical or other forms.

The units described as separate components may be separated physically or not, components displayed as units may be physical units or not, namely, may be located in one place, or may also be distributed on multiple network units. A part of or all of the units may be selected to achieve the purposes of the technical solutions in the embodiments of the present disclosure according to actual demands.

In addition, the functional units in the embodiments of the present disclosure may be integrated in a processing unit, or the units singly exist physically, or two or more units are integrated in one unit.

If the integrated unit is implemented in the form of the software functional unit and is sold or used as an independent product, it may be stored in a computer readable storage medium. Based on this understanding, the technical solutions of the present disclosure substantially, or the part contributing to the prior art, or all or a part of the technical solutions may be implemented in the form of a software product, the computer software product is stored in a storage medium, and includes a plurality of instructions enabling a computer device (may be a personnel computer, a server, or a network device, etc.) or a processor to execute all or a part of the steps of the methods in the embodiments of the present disclosure. The foregoing storage medium includes a variety of media capable of storing program codes, such as a USB disk, a mobile hard disk, a read-only memory (ROM), a random access memory (RAM), a magnetic disk, an optical disk or the like.

The foregoing descriptions are merely specific embodiments of the present disclosure, rather than limiting the protection scope of the present disclosure. Any skilled one who is familiar with this art could readily think of variations or substitutions within the disclosed technical scope of the present disclosure, which shall fall within the protection scope of the present disclosure. Accordingly, the protection scope of the claims should prevail over the protection scope of the present disclosure.

What is claimed is:

1. A communication method comprising:
    broadcasting, by an access point, a first request to multiple stations, indicating each of the multiple stations to send a second request for transmitting data;
    receiving, by the access point and in response to the broadcast first request, one or more second requests for transmitting data from one or more of the multiple stations,
        wherein each of the one or more second requests comprises a first sequence identifying a first station among the multiple stations, and a second sequence identifying a second station among the multiple stations, and
        wherein the first sequence is a first long training field (LTF) section which identifies the first station, the second sequence is a second LTF section which identifies the second station;
    receiving, by the access point, a buffer message from each of the one or more multiple stations, wherein the buffer message indicates an amount of to-be-sent data at the associated station;
    selecting by the access point and in response to buffer messages, the buffer messages whose indication of to-be-sent data reaches a threshold, wherein reaching the threshold indicates a station associated with the buffer message needs to perform an uplink data transmission, and wherein the threshold is specified by the access point; and
    determining, by the access point, one or more stations from the one or more multiple stations for uplink data transmission according to the (i) sequence in one of the one or more second requests and (ii) the selected buffer messages.

2. The method according to claim 1, wherein the first sequence and the second sequence are mutually orthogonal.

3. The method according to claim 1, wherein there is a short interframe space (SIFS) between sending the first request and receiving the one or more second requests.

4. A communication method comprising:
    receiving, by a first station, a first request from an access point, wherein the first request indicates one or more stations to send a second request for transmitting data, and wherein the first request is a broadcast request sent to multiple stations;
    sending, by the first station, the second request in response to the first station being able to perform an uplink data transmission, based on the first request,
        wherein the second request comprises a sequence identifying the first station as a station among the multiple stations receiving the first request that needs to perform an uplink data transmission, and
        wherein the sequence identifying the first station is a long training field (LTF) section;
    sending, a buffer message to the access point, wherein the buffer message indicates an amount of to-be-sent data at the first station; and
    performing an uplink data transmission with the access point in response to selection of the first station for the uplink data transmission based on the amount of to-be-sent data indicated by the buffer message.

5. The method according to claim 4, wherein the sequence identifying the first station are mutually orthogonal with sequences identifying other stations which need to perform the uplink data transmission.

6. The method according to claim 4, wherein there is a short interframe space (SIFS) between receiving the first request and sending the second request.

7. A communication apparatus comprising a transmitter, a receiver, and a processor coupled to the transmitter and the receiver; wherein:
    the transmitter is configured to cooperate with the processor to broadcast a first request to multiple stations, indicating to each station to send a second request for transmitting data;
    the receiver is configured to cooperate with the processor to receive one or more second requests for transmitting data, based on the first request, from one or more of the multiple stations,
        wherein each of the one or more second requests comprises a first sequence identifying a first station among the multiple stations, and a second sequence identifying a second station among the multiple stations, and
        wherein the first sequence is a first long training field (LTF) section which identifies the first station, the second sequence is a second LTF section which identifies the second station;
    the receiver is further configured to receive a buffer message from each of the one or more multiple stations, wherein the buffer message indicates an amount of to-be-sent data at the associated station; and
    the processor is configured to:
        select buffer messages whose indication of to-be-sent data reaches a threshold, wherein reaching the threshold indicates a station associated with the buffer message needs to perform an uplink data transmission; and
        determine one or more stations from the one or more multiple stations for uplink data transmission according to the (i) sequence in one of the one or more second requests and (ii) the selected buffer messages.

8. The apparatus according to claim 7, wherein the first sequence and the second sequence are mutually orthogonal.

9. The apparatus according to claim 7, wherein there is a short interframe space (SIFS) between sending the first request and receiving the one or more second requests.

10. A communication apparatus comprising:
a processor;
a receiver configured to cooperate with the processor to receive a first request from an access point, wherein the first request indicates one or more stations to send a second request for transmitting data, and wherein the first request is a broadcast request sent to multiple stations; and
a transmitter configured to cooperate with the processor to send the second request, based on the first request, when the apparatus needs to perform the uplink data transmission,
wherein the second request comprises a sequence identifying the apparatus as a station among the multiple stations receiving the first request that needs to perform an uplink data transmission, and
wherein the sequence identifying the first station is a long training field (LTF) section;
the transmitter is further configured to cooperate with the processor to send a buffer message to the access point, wherein the buffer message indicates an amount of to-be-sent data at the first station; and
the receiver and the transmitter are further configured to cooperate with the processor to perform the uplink data transmission with the access point in response to selection of the apparatus for the uplink data transmission based on the amount of to-be-sent data indicated by the buffer message.

11. The apparatus according to claim 10, wherein the sequence identifying the station is orthogonal with respect to sequences identifying other stations among the multiple stations which also need to perform the uplink data transmission.

12. The apparatus according to claim 10, wherein there is a short interframe space (SIFS) between receiving the first request and sending the second request.

* * * * *